United States Patent

Yano et al.

[11] Patent Number: 6,031,941
[45] Date of Patent: *Feb. 29, 2000

[54] THREE-DIMENSIONAL MODEL DATA FORMING APPARATUS

[75] Inventors: Kotaro Yano, Yokohama; Katsumi Iijima, Hachioji, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/770,317

[22] Filed: Dec. 20, 1996

[30] Foreign Application Priority Data

Dec. 27, 1995  [JP]  Japan ..................... 7-341817

[51] Int. Cl.$^7$ ...................................................... G06K 9/36
[52] U.S. Cl. .................. 382/276; 382/154; 382/285; 382/295; 382/312; 382/313; 382/318
[58] Field of Search ................... 382/276, 285, 382/295, 154, 312, 313, 318

[56] References Cited

U.S. PATENT DOCUMENTS

| | | | |
|---|---|---|---|
| 5,185,667 | 2/1993 | Zimmermann | 358/209 |
| 5,247,590 | 9/1993 | Fukuhara et al. | 382/56 |
| 5,410,346 | 4/1995 | Saneyoshi et al. | 348/116 |
| 5,559,574 | 9/1996 | Kai et al. | 354/400 |
| 5,592,563 | 1/1997 | Zahavi | 382/154 |
| 5,598,486 | 1/1997 | Moriwake et al. | 382/293 |
| 5,647,019 | 7/1997 | Iino et al. | 382/154 |
| 5,668,631 | 9/1997 | Norita et al. | 356/376 |

OTHER PUBLICATIONS

"Object Modeling By Registration Of Multiple Range Images", Yang Chen and Gérard Medioni, Proc. IEEE Int'l Conf. Robotics and Automation, Sacramento, California, Apr. 1991.

"Asymptotic Bayesian Surface Estimation Using An Image Sequence", Yi–Ping Hung et al., vol. 6, No. 2, Jun. 1991, *International Journal of Computer Vision*.

"Multi–Resolution Surface Modeling from Multiple Range Views", Marc Soucy and Denis Laurendeau, Jun. 15, 1992, *Institute of Electrical and Electronics Engineers*.

"A General Surface Approach To The Integration Of A Set Of Range Views", Marc Soucy & Denis Laurendeau., vol. 17, No. 4, Apr. 1, 1995, *IEEE Transactions on Pattern Analysis and Machine Intelligence*.

*Primary Examiner*—Leo H. Boudreau
*Assistant Examiner*—Kanji Patel
*Attorney, Agent, or Firm*—Morgan & Finnegan, LLP

[57] ABSTRACT

In a three-dimensional shape extraction apparatus, a distance distribution extraction unit (54) obtains the distance distribution of an object on the basis of a plurality of images which are sensed by a camera at different image sensing positions, so that the images of the object partially overlap each other, and the position information of the respective image sensing positions of the camera. A three-dimensional model forming unit (55) forms a three-dimensional model of the object by sequentially combining the sequentially calculated distance distributions and the sensed images using the position information. A 3D display image generation unit (56) generates and displays a two-dimensional image from the three-dimensional model.

37 Claims, 14 Drawing Sheets

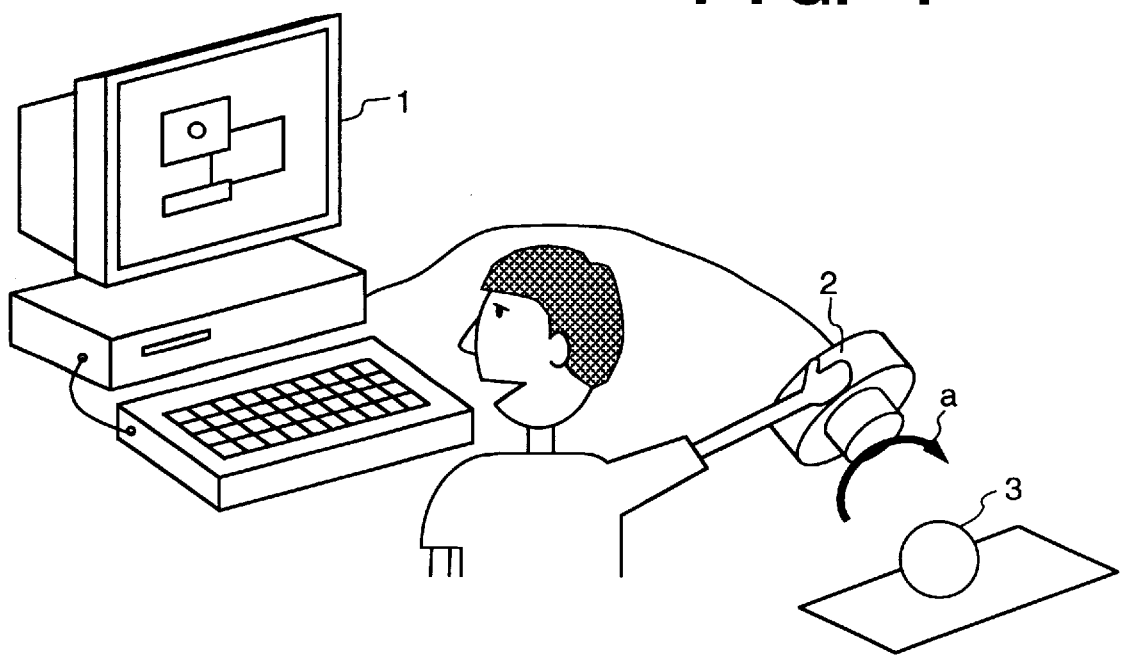
F I G. 1

THREE-DIMENSIONAL MODEL DATA FORMING APPARATUS

BACKGROUND OF THE INVENTION

The present invention relates to a three-dimensional shape extraction apparatus for obtaining three-dimensional information of an object or environment required for forming a stereoscopic model for CG or CAD from a two-dimensional image.

As a conventional technique for obtaining the three-dimensional shape of an object, a technique described in Journal of Television Society, Vol. 45, No. 4 (1991), pp. 453–460, is known. As described in this reference, methods of obtaining the three-dimensional shape of an object are roughly classified into passive and active methods. One typical passive method is stereoscopic imaging, in which trigonometric measurements are performed using two cameras. In this method, the positions of images of an identical object are detected from the right and left images, and the three-dimensional position of the object is measured based on the displacement amount between the two positions. A typical active method is an optical radar type range finder that obtains the distance by measuring the time until light projected toward and reflected from an object. Another example of an active method is the slit light projection method for projecting a slit-shaped optical pattern onto an object, in which the three-dimensional shape is measured on the basis of the displacement of the pattern shape formed on the object. Other passive and active methods are known.

However, in the above-mentioned stereoscopic image method, a large-scale apparatus is required, and since the two cameras must be aligned with high precision, the setting operation is difficult. In addition, since the three-dimensional shape cannot be obtained for a hidden region which is not seen in an image, such as the back surface of an object, the cumbersome setting operation must be repeated. Therefore, it is very difficult to obtain a required portion of the three-dimensional shape of an object. In the active method, since some energy such as light is incident onto an object; if the distance to the object is large, the intensity of the energy must be increased, resulting in an increase in power consumption.

It is, therefore, an object of the invention to provide a three-dimensional shape extraction apparatus which can efficiently obtain a required portion of the three-dimensional shape of an object by a passive method without performing any cumbersome setting operation.

It is another object of the invention to provide a three-dimensional shape extraction apparatus that can perform display suitable for obtaining the three-dimensional shape on nearly the entire surface of a relatively small object.

It is a further object of the invention to provide a three-dimensional shape extraction apparatus that can perform display suitable for obtaining the three-dimensional distribution of the surface of a relatively large object over a broad range.

SUMMARY OF THE INVENTION

The present invention is characterized by the following arrangement. An apparatus for extracting the three-dimensional shape of an object sensed by image sensing means, comprises first detection means for detecting the image sensing position of the image sensing means, second detection means for detecting the lens position of the image sensing means, calculation means for calculating a predetermined parameter on the basis of the outputs from the first and second detection means, distance distribution extraction means for extracting the distance distribution of the object using a plurality of images sensed by the image sensing means at a plurality of image sensing positions so that the respective images of the object partially overlap each other, and the calculated parameter, three-dimensional model forming means for forming a three-dimensional model of the object using the distance distribution obtained from the distance distribution extraction means, the plurality of images obtained from the image sensing means, and the parameter, and two-dimensional image generation means for generating a two-dimensional image on the basis of the output from the three-dimensional model forming means.

According to the present invention, the distance distribution extraction means obtains the distance distribution of the object on the basis of a plurality of images sensed at a plurality of image sensing positions, so that the respective images of the object partially overlap each other, and detection position information obtained by detecting the respective image sensing positions. The three-dimensional model forming means combines the distance distributions obtained in turn and the sensed images using the detection positions, thereby forming the three-dimensional model of the object. A stereoscopic two-dimensional image can be displayed based on the three-dimensional model.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a perspective view showing a three-dimensional shape extraction apparatus according to the first embodiment of the present invention;

DESCRIPTION OF PREFERRED EMBODIMENTS

First Embodiment

The first embodiment of the present invention will be described hereinafter. The operation of a three-dimensional shape extraction apparatus of this embodiment will be briefly explained below with reference to FIGS. 1 to 3.

Figure 2:
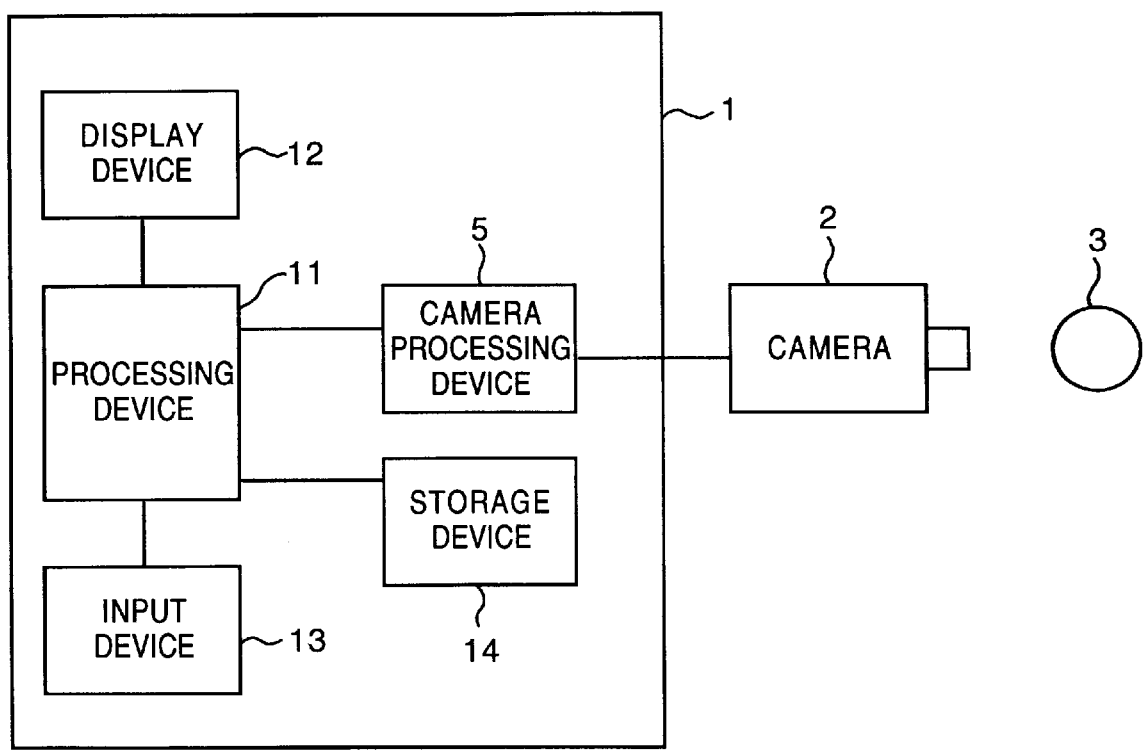
FIG. 2 is a block diagram showing the basic arrangement of the three-dimensional shape extraction apparatus according to the first embodiment of the present invention.

FIG. 1 shows the concept of the three-dimensional shape extraction method in a three-dimensional shape extraction apparatus according to the first embodiment of the present invention. As shown in FIG. 1, a camera 2 is connected to a computer 1 that performs graphics processing, CAD processing, or the like. A user inputs an image by scanning the camera 2 around an object 3 to be measured. The scanning occurs in the direction of arrow a. Note that the camera 2 is movably set on a panpod (not shown) or the like. FIG. 2 is a block diagram showing the basic arrangement of the apparatus. The computer 1 comprises a processing device 11 for performing arithmetic processing and graphics processing, a display device 12 such as a CRT for displaying an image and the like, an input device 13 such as a keyboard, mouse, or the like, which is used for inputting commands and the like, and a storage device 14 such as an IC memory, a hard disk device, or the like. Furthermore, the computer 1 comprises a camera processing device 5 for performing processing (to be described in detail later) associated with the camera 2. An explanation of this embodiment will be given below on the basis of the arrangement shown in FIGS. 1 and 2. For example, the camera processing device 5 may be arranged in the camera 2, or the processing device 11 may use its internal program to realize the processing of the camera processing device 5.

The three-dimensional shape is input by starting an image input program on the computer 1. When the user starts the image input program by inputting a command from the input device 13, a window (to be referred to as a finder window or simply as a window hereinafter) 32 (FIG. 3) corresponding to the finder of the camera is generated on the display device 12 of the computer 1. When the user turns on the switch of the camera 2, an image sensed by the camera 2 is directly displayed within the window 32. The user determines framing while observing the displayed image, so that the object 3 to be measured is located at nearly the center of the window, and thereafter, he or she presses a shutter. The user moves the camera 2 in the direction of the arrow a, and presses the shutter several times during the movement, thus scanning the object 3 to be measured. With this operation, image data is acquired from the object 3 from a plurality of view points. When the image data is processed by the camera processing device 5 and the processing device 11, three-dimensional data of the object 3 to be measured are obtained. In the plurality of image sensing operations that occur upon movement of the camera 2, the respective sensed images must include overlapping portions to allow image synthesis processing to be described later.

Figure 3:
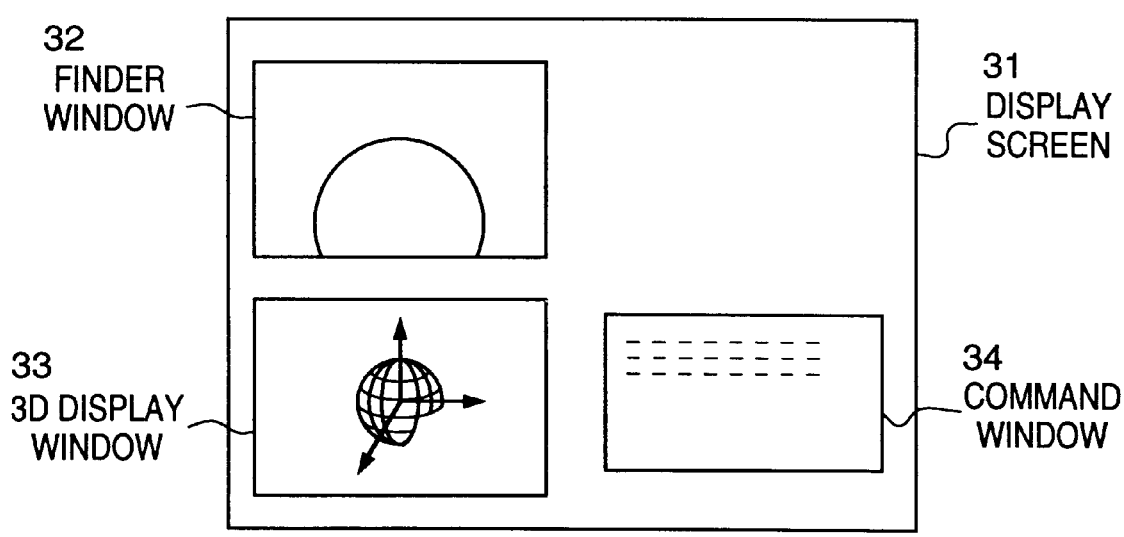
FIG. 3 is a view showing a display example upon inputting an image according to the first embodiment of the present invention.

Referring to FIG. 3, upon executing the scanning, when the user presses the shutter, a window (to be referred to as a 3D display window hereinafter) 33 is generated. Window 33 is for displaying a three-dimensional model of the object 3 to be measured. Images representing the three-dimensional model of the object 3 to be measured are displayed in succession on the 3D display window 33 in the order that the three-dimensional image data of the object 3 are acquired. FIG. 3 shows a display example of an screen 31 of the display device 12 of the computer 1. The user observes the image on the 3D display window 33, and completes the input operation if he or she confirms that a desired three-dimensional model of the object 3 to be measured is obtained. Note that FIG. 3 shows the state wherein an intermediate three-dimensional shape of the object 3 to be measured is displayed on the 3D display window 33.

The arrangement and operation of this embodiment will be described in more detail below.

Internal Arrangement of Camera

Figure 4:
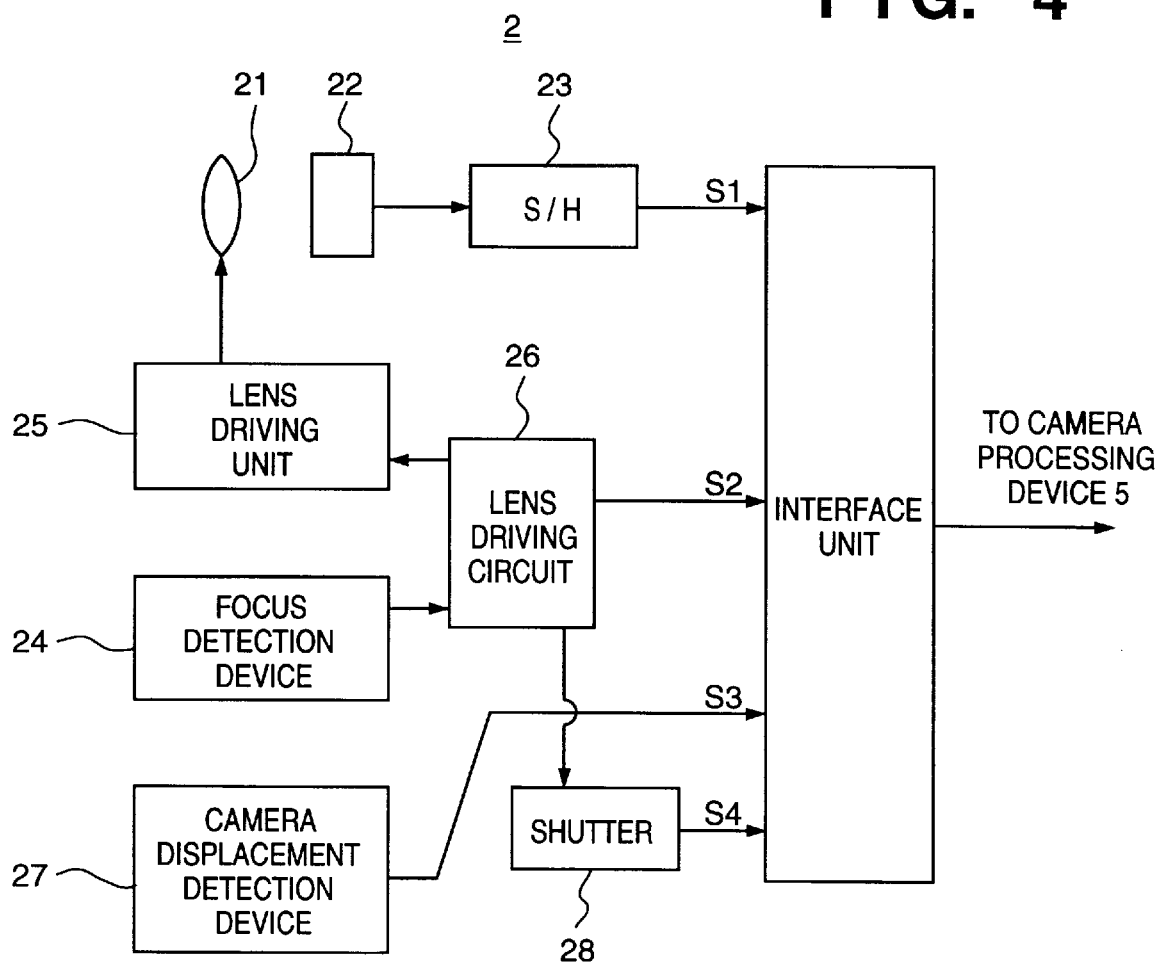
FIG. 4 is a block diagram showing the arrangement of a camera according to the first embodiment of the present invention.

FIG. 4 is a block diagram showing the arrangement of the camera 2. Camera 2 includes an image sensing lens 21 for sensing an image of the object 3 to be measured; an image sensor 22 such as a CCD for fetching an image as an electrical signal, and a sample & hold (S/H) circuit 23 for holding the electrical signal output from the image sensor 22, and outputting the electrical signal as an image signal S1. The image sensor 22 is adjusted so that the center of its detection image region nearly crosses the optical axis of the image sensing lens 21, and its detection surface is nearly perpendicular to the optical axis of the image sensing lens 21. The focus detection device 24, e.g. an auto-focusing mechanism of a camera projects infrared rays from an LED (not shown) toward an object, receives reflected light returning to the camera using a line sensor, and detects the focal point position on the basis of the light-receiving position.

The lens driving unit 25 a pulse motor or the like drives the image sensing lens 21 in a direction parallel to the optical axis to attain focusing. Reference numeral 26 denotes a lens driving circuit which controls the lens driving unit 25 in accordance with a focal point position detection signal from the focus detection device 24, and outputs a lens position signal S2. A camera displacement detection device 27 includes an angular velocity sensor such as an acceleration sensor, a vibration gyro, or the like, and an integrator, or the like. The camera displacement detection device 27 detects the displacement of the camera position and posture, and outputs it as a camera displacement signal S3. The axis of the detection rotation angle of the camera displacement detection device 27 is adjusted to roughly agree with the optical axis of the image sensing lens 21, and the horizontal and vertical axes of the image sensor 22. The origin of these three coordinate axes nearly matches the central position of the camera displacement detection device 27. A shutter 28 outputs a shutter signal S4. An interface unit 29 transfers, in parallel, the output signals S1 to S4 from the camera to the camera processing device 5.

Internal Arrangement of Camera Processing Device

The arrangement of the camera processing device 5 will be explained below.

Figure 5:
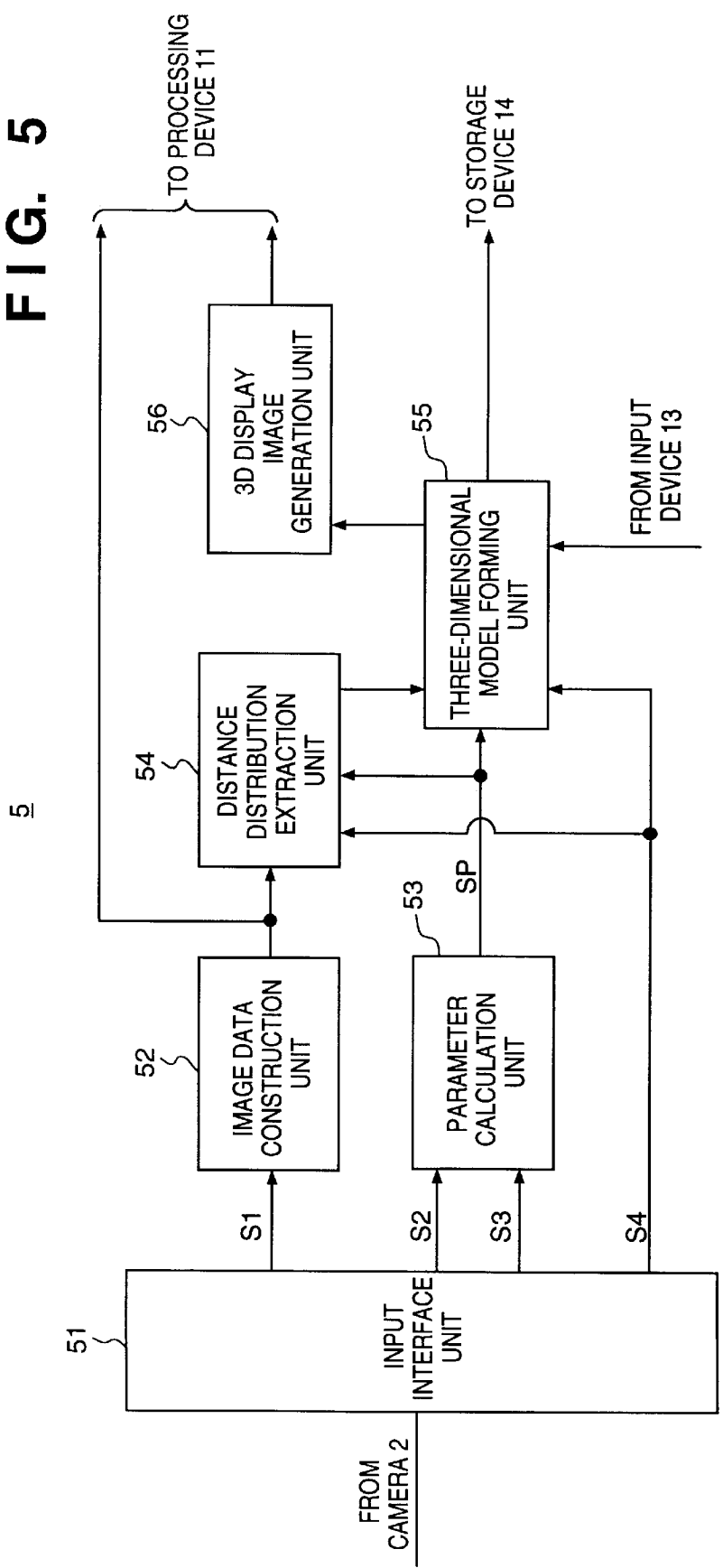
FIG. 5 is a block diagram showing the arrangement of a camera processing device according to the first embodiment of the present invention.

FIG. 5 is a schematic block diagram showing the arrangement of the camera processing device 5. The arrangement and operation of the camera processing device 5 will be briefly described below with reference to FIG. 5. Reference numeral 51 denotes an input interface unit for receiving the image signal S1, the lens position signal S2, the camera displacement signal S3, and the shutter signal S4 sent from the camera 2, The input interface unit distributes signals S1, S2, S3, and S4 to the respective units, as shown in FIG. 5. An image data construction unit 52 processes the image signal S1. The image data construction unit 52 includes an auto gain control circuit, a gamma correction circuit, and an A/D converter. The image data construction unit 52 performs the automatic gain control of the image signal S1 using the auto gain control circuit, and then performs gradation correction of the output signal using the gamma correction circuit. Thereafter, the output signal from the gamma correction circuit is converted into digital image data by the A/D converter, and the digital image data are output.

A parameter calculation unit 53 outputs parameter SP data, including the view point position [THE view point position is the position from the center of a digital image obtained from the image sensor 22 at the principal point (to be referred to as a view point hereinafter) of the image sensing lens 21 according to the value of the lens position signal S2, and represents the optical layout of the image sensing system including the image sensing lens 21 and the image sensor 22 The parameter SP data also includes, the view point moving amount, and the optical axis rotation amount, which are the parameters generated as output signals from camera 2, on the basis of the lens position signal S2 and the camera displacement signal S3. A distance distribution extraction 54 unit obtains the distance distribution in the overlapping portion of the object on the basis of two sets of image data sensed at different view point positions, i.e., image data obtained at times t and t', that are outputs from the image data construction unit 52, and the parameter SP data output from the parameter calculation unit 53.

A three-dimensional model forming unit 55 sequentially forms a three-dimensional model of the object 3 to be measured on the basis of the distance distribution output from the distance distribution extraction unit 54, the image data, and the parameter SP data output from the parameter calculation unit 53. Reference numeral 56 denotes a 3D display image generation unit for generating an image to be displayed on the 2D display window on the basis of the three-dimensional model of the object 3 to be measured formed by the three-dimensional model forming unit 55.

The respective blocks of the camera processing device 5 will be described in detail below with reference to FIGS. 6 to 9.

Figure 6:
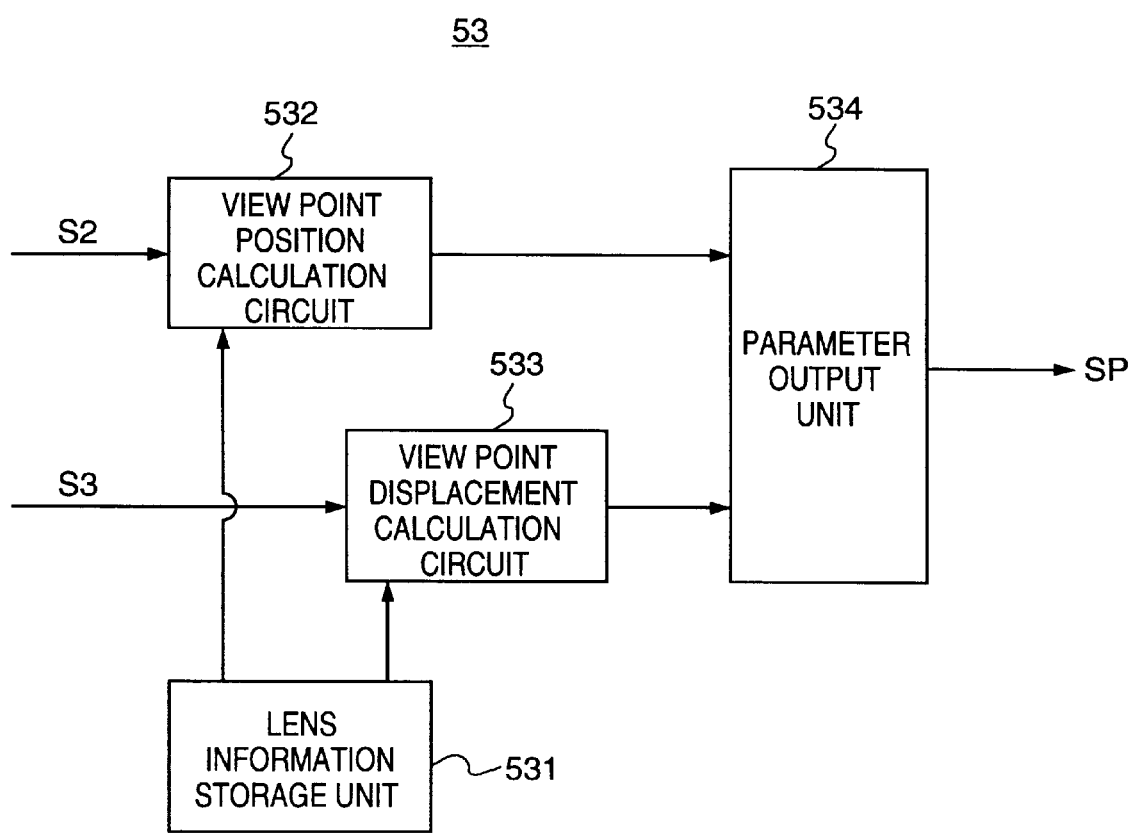
FIG. 6 is a block diagram showing the arrangement of a parameter calculation unit according to the first embodiment of the present invention.

FIG. 6 shows the arrangement of the parameter calculation unit 53. A lens information storage unit 531 stores information such as the focal length and the like inherent to the image sensing lens 21. A view point position calculation circuit 532 calculates the view point position on the basis of the lens position signal S2 and the data stored in the lens information storage unit 531. A view point displacement calculation circuit 533 calculates the view point moving amount and the optical axis rotational displacement amount of the image sensing lens 21 on the basis of the camera displacement signal S3 and the data stored in the lens information storage unit 531. A parameter output unit 534 outputs, upon image sensing, the view point position, view point moving amount, and optical axis rotation amount as the parameter SP data.

Figure 7:
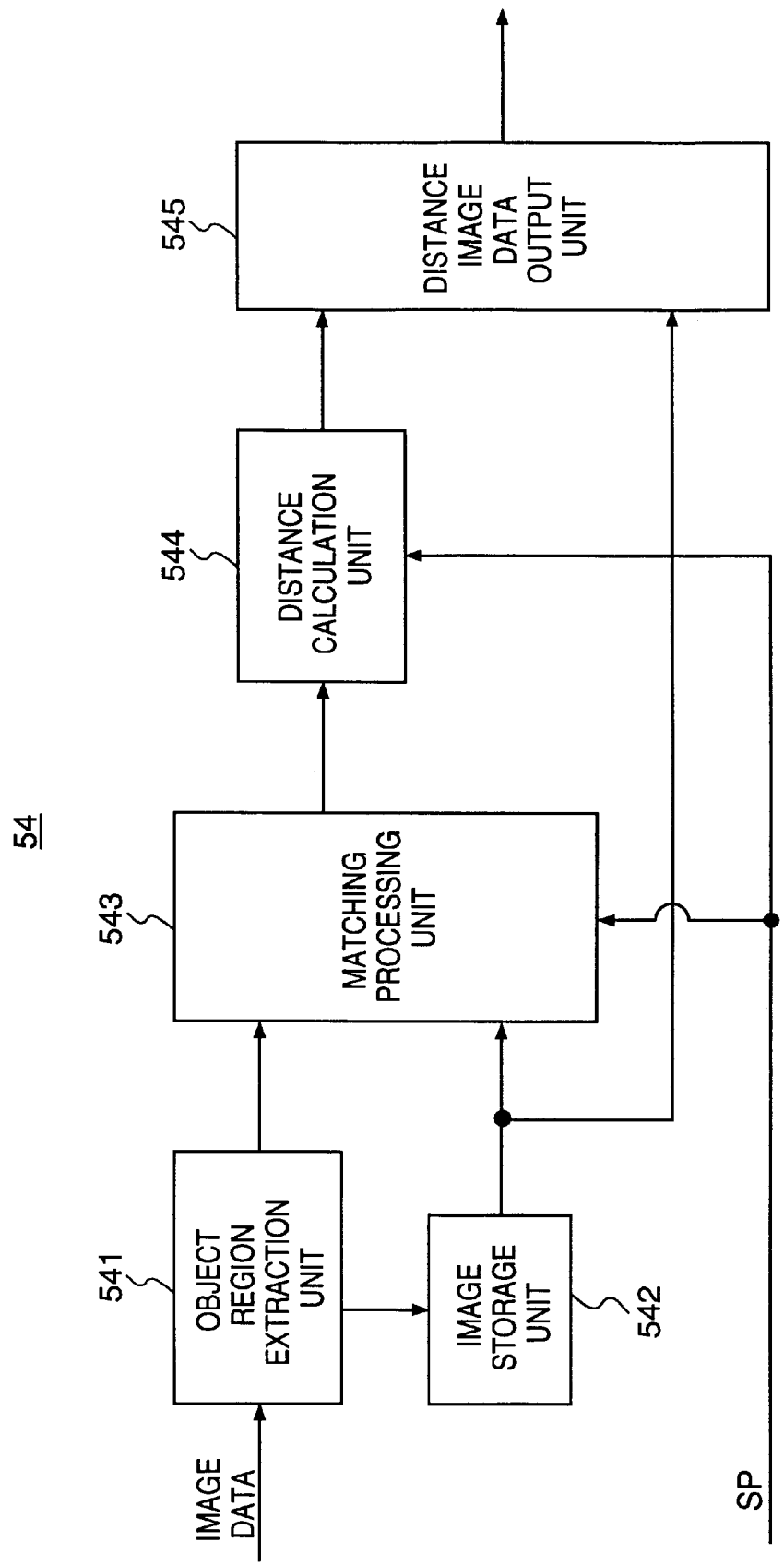
FIG. 7 is a block diagram showing the arrangement of a distance distribution extraction unit according to the first embodiment of the present invention.

FIG. 7 shows the arrangement of the distance distribution extraction unit 54. An object region extraction unit 541, extracts the region of an object (the object 3 to be measured in this case) present in the sensed image from image data input from the image data construction unit 52, and generates an object image of only the extracted object region. An image storage unit 542 temporarily stores the object image output from the object region extraction unit 541. A matching processing unit, 543 performs matching between the object image currently extracted by the object region extraction unit 541 on the basis of the two sets of image data, and the previous object image already stored in the image storage unit 542 by utilizing the parameter SP data, i.e., the view point position, view point moving amount, and the optical axis rotation amount. A distance calculation unit, 544 calculates the distance to the object on the basis of the parameter SP data, i.e., the view point position, view point moving amount, and optical axis rotation amount, and a pair of corresponding points output from the matching processing unit 543. The pair of corresponding points is a pair from a certain pixel of image data at times t and t'. These data points should physically correspond to the same portion of the object. A distance image data output unit 545 outputs a combination of the image data and the distance data output from the distance calculation unit 544. These processing operations are performed while sequentially updating data every time the shutter is pressed.

Figure 8:
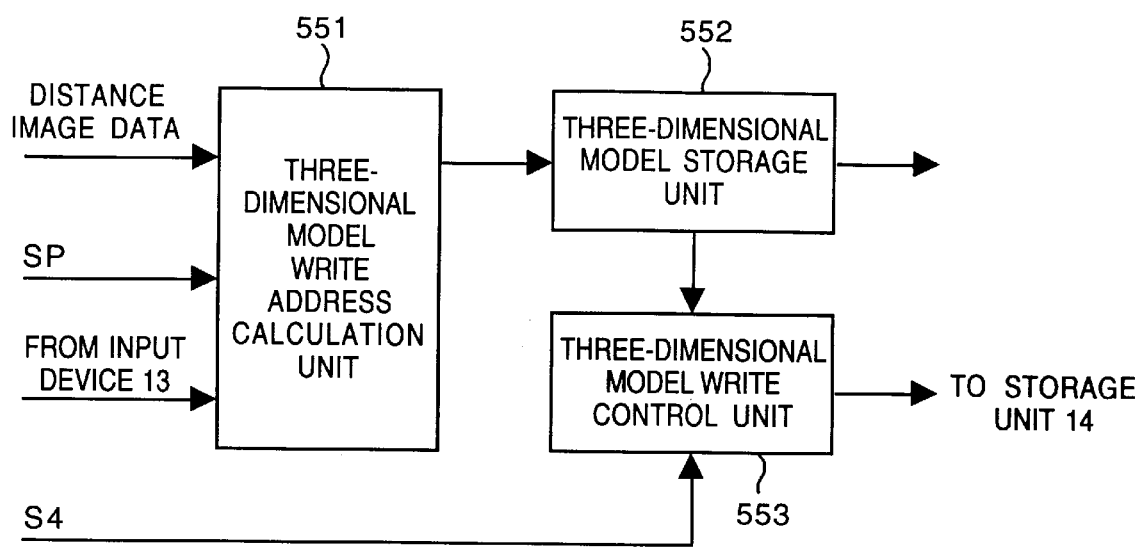
FIG. 8 is a block diagram showing the arrangement of a three-dimensional model forming unit according to the first embodiment of the present invention.

FIG. 8 shows the arrangement of the three-dimensional model forming unit 55. A three-dimensional model write address calculation unit 551 converts the distance data into polar coordinate data using the parameter SP data, i.e., the view point position, view point moving amount, and optical axis rotation amount. A three-dimensional model storage unit 552 stores image data at the address corresponding to the coordinate value of the polar coordinate data as the output from the three-dimensional model write address calculation unit 551. A three-dimensional model write control unit 553 performs write control of the three-dimensional model data of the object 3 to be measured stored in the three-dimensional model storage unit 552 in the storage device 14.

Figure 9:
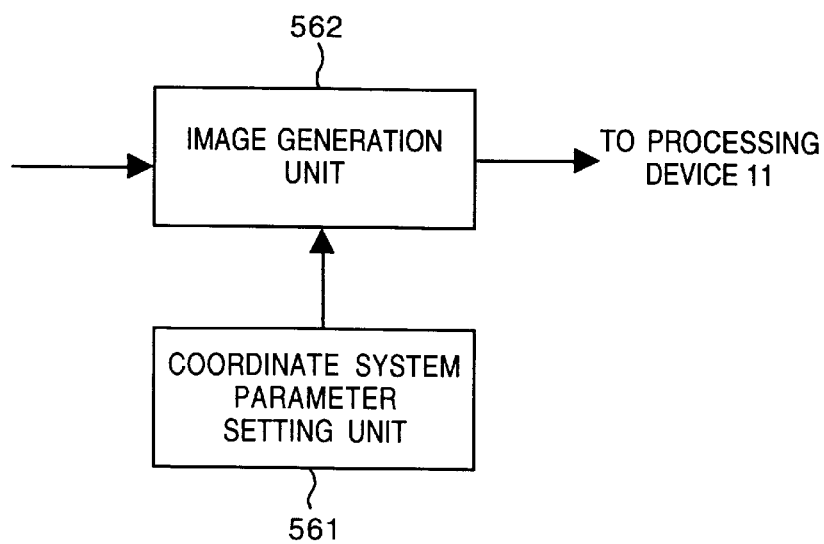
FIG. 9 is a block diagram showing the arrangement of a 3D display image generation unit according to the first embodiment of the present invention.

FIG. 9 shows the arrangement of the 3D display image generation unit 56. A coordinate system parameter setting unit 561 sets the directions of the coordinate axes of the coordinate system, the view point position, and the visual axis direction of the image to be displayed. An image generation unit 562 reads out the three-dimensional model data of the object from the three-dimensional model storage unit 552 in accordance with the parameters of the coordinate system parameter setting unit 561 Image generation units 562 generates a display image.

Operation of Camera and Camera Processing Device

The operations of the camera 2 and the camera processing device 5 upon inputting an image while scanning the camera 2 around the object 3 to be measured will be described below.

When the image input program of the computer 1 is started, the processing device 11 in the computer 1 generates a finder window 32 and displays it on the display device 12. An image fetched via the image sensing lens 21 in the state wherein the power switch of the camera 2 is ON is supplied as an image signal S1 to the camera processing device 5 via the image sensor 22, the S/H circuit 23, and the interface unit 29. The image signal S1 is received by the input interface unit 51 of the camera processing device 5, and is output as digital image data via the image data construction unit 52. The digital image data is written in an internal graphic memory of the processing device 11 in the computer 1, and the processing device 11 displays this image on the finder window 32 of the display device 12.

During this interval, the focus detection device 24 always detects the defocus amount in a region corresponding to nearly the center of the image sensing frame of the image sensor 22, and the lens driving circuit 26 drives the lens driving unit 25 in accordance with a signal detected by the focus detection device 24. The lens driving unit 25 drives the image sensing lens 21 to attain an in-focus state. At this time, the lens driving circuit 26 supplies the signal for controlling the lens driving unit 25 to the camera processing device 5 via the interface unit 29 as a lens position signal S2. The lens position signal S2 supplied at that time represents the displacement of the image sensing lens 21 from its reference position. With the above-mentioned operation, the image fetched via the image sensing lens 21 is directly displayed on the finder window 32.

The user determines framing while observing the displayed image, and then presses the shutter 28. When the shutter 28 is pressed, the lens driving circuit 26 signals the lens driving unit 25 not to drive the image sensing lens 21, thereby fixing the focal point position of the image sensing lens 21. A shutter signal S4 from the shutter 28 is supplied to the camera processing device 5 via the interface unit 29.

The camera displacement detection device 27 always detects the displacement of the position and posture of the camera 2 while the power switch of the camera 2 is ON, and supplies a camera displacement signal S3 to the camera processing device 5 via the interface unit 29. The lens position signal S2 supplied to the camera processing device 5 is also supplied to the view point position calculation circuit 532 in the parameter calculation unit 53 via the input interface unit 51. The view point position calculation circuit 532 obtains the view point position by reading out a view point position correction table stored in the lens information storage unit 531 in accordance with the value of the lens position signal S2. More specifically, the view point position correction table stored in the lens information storage unit 531 stores view point position data from the central position of a digital image obtained from the image sensor 22 when the image sensing lens 21 is located at the displaced position according to the value of the lens position signal S2. The view point position data has three components: an optical axis direction component f of the image sensing lens 21, and horizontal and vertical direction components ($\Delta x$, $\Delta y$) of the image sensor 22 perpendicular thereto. Ideally, f nearly equals the focal length of the image sensing lens 21, and ($\Delta x$, $\Delta y$) nearly equals 0.

The camera displacement signal S3 supplied to the camera processing device 5 is also supplied to the view point displacement calculation circuit 533 in the parameter calculation unit 53 via the input interface unit 51. The camera displacement signal S3 supplied from the camera 2 represents the information of the positional displacement and angular displacement in the coordinate system that can be determined by three orthogonal coordinate axes having the center of the camera displacement detection device 27 as the origin. The view point displacement calculation circuit 533 performs a matrix calculation using this camera displacement signal S3 and view point conversion data stored in the lens information storage unit 531, thereby calculating a positional displacement T (to be referred to as a view point moving amount hereinafter) and an angular displacement R (to be referred to as an optical axis rotation amount hereinafter) in the coordinate system that can be determined by the optical axis of the image sensing lens 21 and the horizontal and vertical axes of the image sensor 22. The coordinate system has as it origin at the intersection of the detection surface of the image sensor 22 with the optical axis of the image sensing lens 21.

More specifically, the processing of the view point displacement calculation circuit 533 can correct the displacements between the origins and coordinate axes of the camera displacement detection device 27 and the image sensing lens 21. Therefore, the lens information storage unit 55 stores a conversion matrix for converting the camera displacement signal S3 detected by the camera displacement device 27 into the view point moving amount and the optical axis rotation amount as view point conversion data. The view point position data, the view point moving amount data, and the optical axis rotation amount data are combined as the parameter SP data of the parameter calculation unit 53 in the parameter output unit 534.

The distance distribution extraction unit 54 extracts the distance distribution of the object 3 to be measured from two sets of digital image data obtained at different times $t=t_1$ and $t=t_2$ and the parameter SP data (view point position data, view point moving amount data, and optical axis rotation amount data) as a result of the above-mentioned processing. Image data input from the image data construction unit 52 is converted into an object image of only the object region by the object region extraction unit 541. The object region extraction unit 541 detects the edge of the input image data to divide the image into small regions, and re-combines regions into an object region and a background pattern region by utilizing features such as luminance level, texture, and the like, thereby obtaining the object image of only the object region. The object image data is temporarily stored in the image storage unit 542. When the object region extraction unit 541 obtains only an object image from the image data input at the next time, the matching processing unit 543 performs matching between the object image data (to be referred to as image #2 hereinafter) output from the object region extraction unit 541, and the object image data (to be referred to as image #1 hereinafter) stored in the image storage unit 542 by utilizing the parameters, i.e., the view point position, the view point moving amount, and the optical axis rotation amount.

In general, feature points in two sets of images sensed by a camera can have a one-to-one correspondence therebetween on the basis of the view point position, the view point moving amount, the optical axis rotation amount, and the object distance. More specifically, this relationship will be explained below with reference to FIGS. 10A and 10B. A point P on the object 3 to be measured corresponding to a point p at time t=$t_1$ is obtained by the view point position f, ($\Delta x$, $\Delta y$), and an object distance Zp. The point P on the object 3 to be measured is coordinate-converted using the view point moving amount T and the optical axis rotation amount R. Then, a point p' is obtained at time t=$t_2$ as another image point by the view point position f, ($\Delta x$, $\Delta y$), and an object distance Zp'.

The matching processing unit 543 calculates upper and lower limit values for the object distance, view point moving amount, and optical axis rotation amount. Then, the matching processing unit 543 determines a matching candidate region between these calculated upper and lower limit values, and performs matching processing in the determined matching region. At this time, a small region of the object region of image #1 is extracted as a template, and the extracted template is translated by giving a position offset thereto, so as to perform template matching with image data within the range of the possible matching region of image #2, thereby detecting coordinates ($x_2$, $y_2$) of image #2 corresponding to coordinates ($x_1$, $y_1$) of image #1. The template matching processing is repeated in correspondence with the image data (pixels) of the object region of image #1, thereby outputting corresponding points between pixels in the object regions of images #1 and #2.

The distance calculation unit 544 calculates the distance using the parameter SP data, i.e., the view point position, the viewpoint moving amount, and the optical axis rotation amount, and pairs of corresponding points which are the output from the matching processing unit 543. The distance calculation method will be described below. Let $x_1 y_1$ and $X_1 Y_1 Z_1$ be the coordinate system of the image surface and the spatial coordinate system of image #1; respectively $x_2 y_2$ and $X_2 Y_2 Z_2$ are the coordinate system of the image surface and the spatial coordinate system of image #2; respectively and ($\Delta X$, $\Delta Y$, $\Delta Z$) and ($\Delta \alpha$, $\Delta \beta$, $\Delta \gamma$) are the view point moving amount T and the optical axis rotation amount R respectively. Note that the components $\Delta X$, $\Delta Y$, and $\Delta Z$ of the view point moving amount respectively represent the moving amounts in the $X_1$, $Y_1$, and $Z_1$ directions, and the components $\Delta \alpha$, $\Delta \beta$, and $\Delta \gamma$ respectively represent the rotation angles about the $X_1$, $Y_1$, and $Z_1$ axes. Then, the relationship between the coordinate system of the image surface and the spatial coordinate system of image #1 is given by:

$$\frac{f}{Z_1}\begin{pmatrix} X_1 \\ Y_1 \end{pmatrix} = \begin{pmatrix} x_1 - \Delta x \\ y_1 - \Delta y \end{pmatrix} \tag{1}$$

Also, the relationship between the coordinate system of the image surface and the spatial coordinate system of image #2 is defined by:

$$\frac{f}{Z_2}\begin{pmatrix} X_2 \\ Y_2 \end{pmatrix} = \begin{pmatrix} x_2 - \Delta x \\ y_2 - \Delta y \end{pmatrix} \tag{2}$$

Furthermore, the relationship between the spatial coordinate systems $X_1 Y_1 Z_1$ and $X_2 Y_2 Z_2$ is described by:

$$\begin{pmatrix} X_2 \\ Y_2 \\ Z_2 \end{pmatrix} = M \begin{pmatrix} X_1 \\ Y_1 \\ Z_1 \end{pmatrix} - \begin{pmatrix} \Delta X \\ \Delta Y \\ \Delta Z \end{pmatrix} \tag{3}$$

for $$M(\Delta\alpha, \Delta\beta, \Delta\gamma) = \begin{pmatrix} \cos\Delta\beta \cdot \cos\Delta\gamma & \cos\Delta\beta \cdot \sin\Delta\gamma & -\sin\Delta\beta \\ \sin\Delta\alpha \cdot \sin\Delta\beta \cdot \cos\Delta\gamma - \cos\Delta\alpha \cdot \cos\Delta\gamma & \sin\Delta\alpha \cdot \sin\Delta\beta \cdot \sin\Delta\gamma + \cos\Delta\alpha \cdot \cos\Delta\gamma & \sin\Delta\alpha \cdot \cos\Delta\beta \\ \cos\Delta\alpha \cdot \sin\Delta\beta \cdot \cos\Delta\gamma + \sin\Delta\alpha \cdot \sin\Delta\gamma & \cos\Delta\alpha \cdot \sin\Delta\beta \cdot \sin\Delta\gamma - \sin\Delta\alpha \cdot \cos\Delta\gamma & \cos\Delta\alpha \cdot \cos\Delta\beta \end{pmatrix}$$

More specifically, a distance $Z_1$ at each point in the object region of image #1 is calculated using equations (1) to (3) above. At this time, distances are respectively calculated from the relations corresponding to x and y, and the distance calculated using the relations for x and the distance calculated using the relations for y are averaged. $X_1$ and $Y_1$ are calculated using $Z_1$ and equation (1) above to output coordinates ($X_1$, $Y_1$, $Z_1$) in correspondence with the number of pairs of corresponding points. The spatial coordinate data are combined as the output from the distance distribution extraction unit 54 together with a pixel value g at the coordinates ($x_1$, $y_1$) of image #1, and are output in the form of ($X_1$, $Y_1$, $Z_1$, g).

Figure 11:
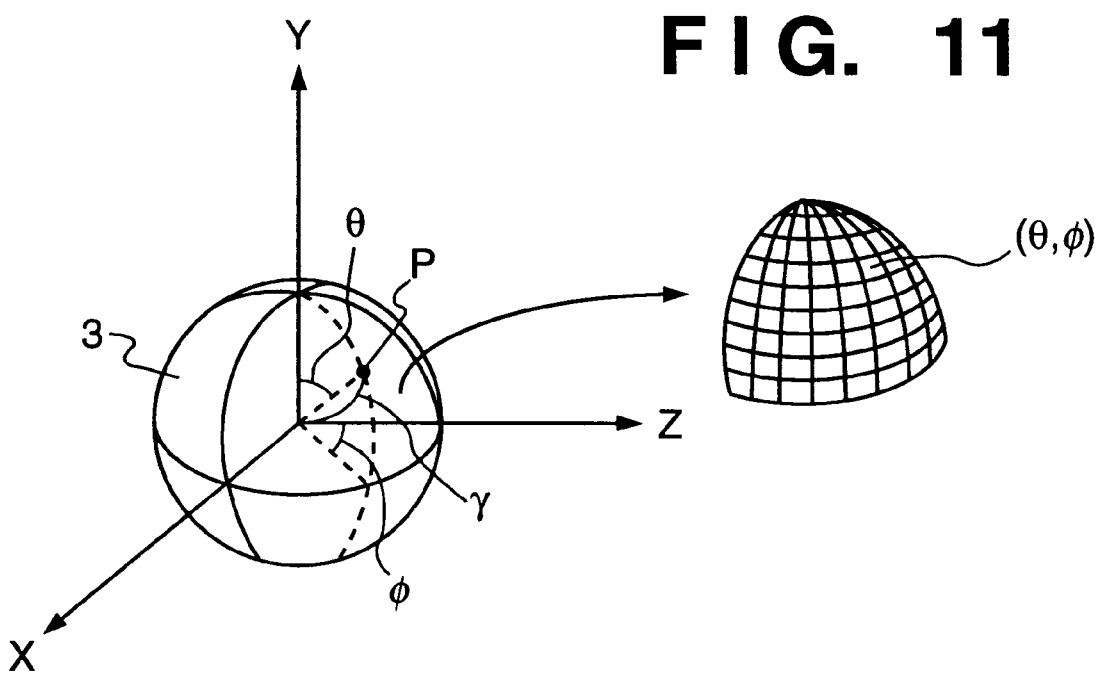
FIG. 11 is an explanatory view for explaining the processing of the three-dimensional model forming unit according to the first embodiment of the present invention.

Subsequently, the three-dimensional model forming unit 55 forms a three-dimensional model of the object 3 to be measured using the distance image data as the output from the distance distribution extraction unit 54 and the parameter SP data. As shown in FIG. 11, the three-dimensional model of the object 3 to be measured defines the surface shape of the object 3 to be measured using the spatial coordinates (r, θ, φ) of the spherical coordinate system, and has an r component (radial component) and pixel values as data in units of regions, also referred to as angle parameters (θ, φ). Each region (θ, φ) is a mesh-shaped region designated by the input device 13 in accordance with the resolution of the three-dimensional shape. Also, the spatial coordinates of the origin of the polar coordinate system (r, θ, φ) are also designated from the input device 13. The distance data are converted into polar coordinates by the three-dimensional model write address calculation unit 551 on the basis of the parameter SP data, i.e., the view point position, view point moving amount, and optical axis rotation amount, and the origin coordinates of the polar coordinate system, and r components. Then, pixel values are written at addresses corresponding to regions (θ, φ) of the three-dimensional model storage unit 552. At this time, counters corresponding to the respective storage areas are incremented.

When the next distance image data input from the distance distribution extraction unit 54, and the converted data are written in the already stored area, the average value of data is stored as new three-dimensional model data of the object 3 to be measured with reference to the value of each counter. In this manner, the three-dimensional model of the object 3 to be measured is formed by sequentially adding the data of the three-dimensional model to the three-dimensional model storage unit 552 while the shutter signal S4 supplied to the camera processing device 5 via the input interface unit 51 is ON.

The 3D display image generation unit 56 converts the three-dimensional model data of the object 3 to be measured into a two-dimensional display image. More specifically, the image generation unit 562 generates a two-dimensional image by performing perspective transformation (viewing transformation) shown in FIG. 12 on the basis of the directions of the coordinate axes of the coordinate system, view point position, and visual axis direction of a display image, The parameter are set in advance in the coordinate system parameter setting unit 561. The polar coordinate value (r, θ, φ) of the three-dimensional model is sequentially stored in the three-dimensional model storage unit 552, along with the pixel values. At this time, the coordinate system parameter setting unit 561 sequentially changes the directions of the coordinate axes of the coordinate system of the display image. Therefore, a stereoscopic image can be sequentially displayed as if the three-dimensional model of the object 3 to be measured were rotated about the coordinate axes. The user observes this display image, and completes the input operation if he or she confirms that the desired three-dimensional data is obtained. The three-dimensional model write control unit 553 controls the writing of the three-dimensional model of the object 3 to be measured formed in the three-dimensional model storage unit 552 in the storage device 14 of the computer 1 when the shutter signal S4 changes from the ON state to the OFF state.

According to the above-mentioned first embodiment of the present invention, images can be input while sequentially monitoring the three-dimensional shape of the object 3 to be measured, and desired three-dimensional data can be obtained. This embodiment is particularly effective for the purpose of obtaining the three-dimensional shape of nearly the entire surface of the object 3 to be measured when the size of the object 3 to be measured is relatively small like an object that can be placed on a table.

Second Embodiment

The second embodiment of the present invention will be described below.

The second embodiment of a three-dimensional shape extraction apparatus is effective for the purpose of obtaining the distribution of the three-dimensional shape of the surface of an object when the object is relatively large, such as the environment in a room.

The basic arrangement of the second embodiment of the present invention is substantially the same as that of the first embodiment shown in FIG. 2. Also, the arrangements of the camera 2 and the camera processing device 5 of this embodiment are substantially the same as those of the first embodiment shown in FIGS. 4 and 5. Hence, a detailed description thereof will not be repeated.

Figure 13:
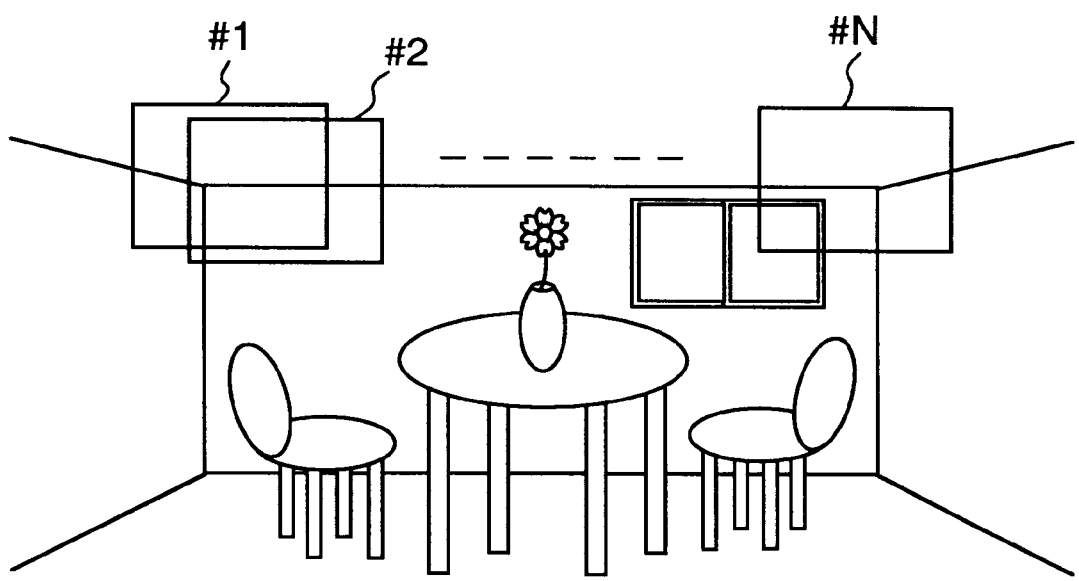
FIG. 13 is a projection view showing the image input state according to the second embodiment of the present invention.
Figure 14:
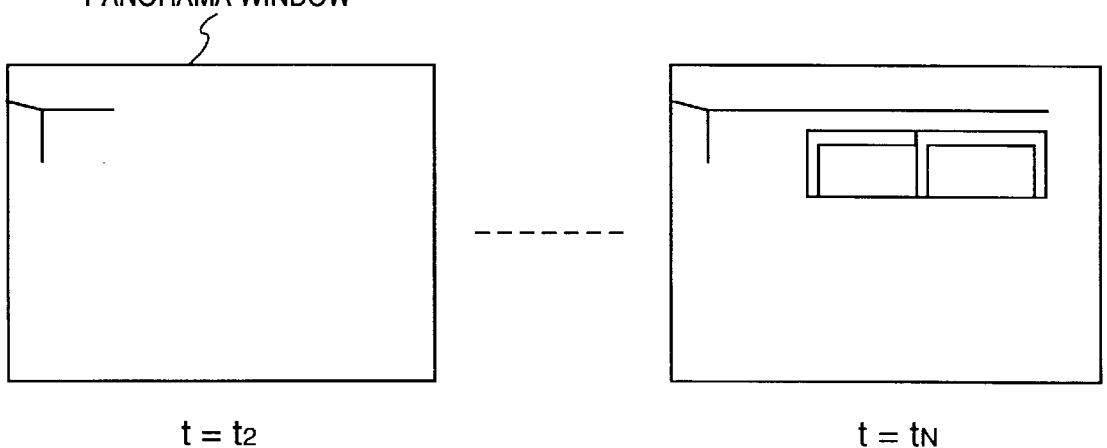
FIG. 14 shows a display example upon inputting an image according to the second embodiment of the present invention.

FIG. 13 shows the image input state in the three-dimensional shape extraction apparatus according to the second embodiment. As shown in FIG. 13, when the object is an environment in a room or the, like, the camera 2 sequentially senses a plurality of images in the order of image #1, image #2, . . . , image #N (image #1 is sensed at time $t=t_1$, image #2 is sensed at time $t=t_2$, and image #N is sensed at time $t=t_N$). The image sensing operation is completed when three-dimensional data within a desired range are obtained. In this image input operation, a window (to be referred to as a panorama window hereinafter) 35 that can display an image in a broad field of view is generated on the display device 12 of the computer 1, and displays the image of the corresponding object in accordance with the regions of the three-dimensional data which are obtained in succession, as shown in FIG. 14. Referring to FIG. 14, the left panorama window at time $t=t_2$ is generated based on images #1 and #2. By repeating the above-mentioned processing until time $t=t_N$, the right panorama window at time $t=t_N$ is generated.

The operation of this embodiment will be described below while focusing on the difference from the first embodiment.

When the image input program of the computer 1 is started as in the first embodiment, the processing device 11 in the computer 1 generates the finder window 32, and displays it on the display device 12. An image fetched via the image sensing lens 21 in the state wherein the power switch of the camera 2 is ON is supplied as an image signal S1 to the camera processing device 5. The image signal S1 is received by the input interface unit 51 of the camera processing device 5, and is output as digital image data via the image data construction unit 52. The digital image data is written in the internal graphic memory of the processing device 11 in the computer 1, and the processing device 11 displays this image on the finder window 32 on the display device 12. At the same time, a lens position signal S2 is supplied to the camera processing device 5.

The user determines framing while observing the displayed image, and then presses the shutter 28. A shutter signal S4 from the shutter 28 is sent to the camera processing device 5. Meanwhile, the camera displacement detection device 27 always detects the displacement of the position and posture of the camera while the power switch of the camera 2 is ON, and sends a camera displacement signal S3 to the camera processing device 5. The lens position signal S2 is supplied to the view point position calculation circuit 532 in the parameter calculation unit 53. The view point position calculation unit 532 obtains the view point position by reading out the view point position correction table stored in the lens information storage unit 531 in accordance with the value of the lens position signal S2. Meanwhile, the camera displacement signal S3 is supplied to the view point displacement calculation circuit 533 which obtains the view point moving amount and the optical axis rotation amount by performing a matrix calculation using view point conversion data stored in the lens information storage unit 531. The view point position data, the view point moving amount data, and the optical axis rotation amount data are combined as output parameter SP data of the parameter calculation unit 53 in the parameter output unit 534.

The distance distribution extraction unit 54 extracts the distance distribution from the digital image data obtained at different times $t=t_1$ and $t=t_2$ and the parameter SP data as a result of the above-mentioned processing. In this embodiment, the object region extraction unit 541 does not perform any processing, and directly outputs sensed image data. Therefore, in the arrangement of the distance distribution extraction unit 54 shown in FIG. 7, the object region extraction unit 541 is not necessary in this embodiment. The matching processing unit 543 performs matching between the image data by utilizing the parameter SP data, i.e., the view point position, view point moving amount, and optical axis rotation amount. The distance calculation unit 544 calculates the distance to the object 3 to be measured on the basis of the parameter SP data, i.e., the view point position, view point moving amount, and optical axis rotation amount, and pairs of corresponding points which are output from the matching processing unit 543. The spatial coordinate data output from the distance calculation unit 544 are combined with the output from the distance distribution extraction unit 54 together with a pixel value g at the coordinates $(x_1, y_1)$ of image #1 in the distance image data output unit 545, and are output in the form of $(X_1, Y_1, Z_1, g)$.

Figure 15:
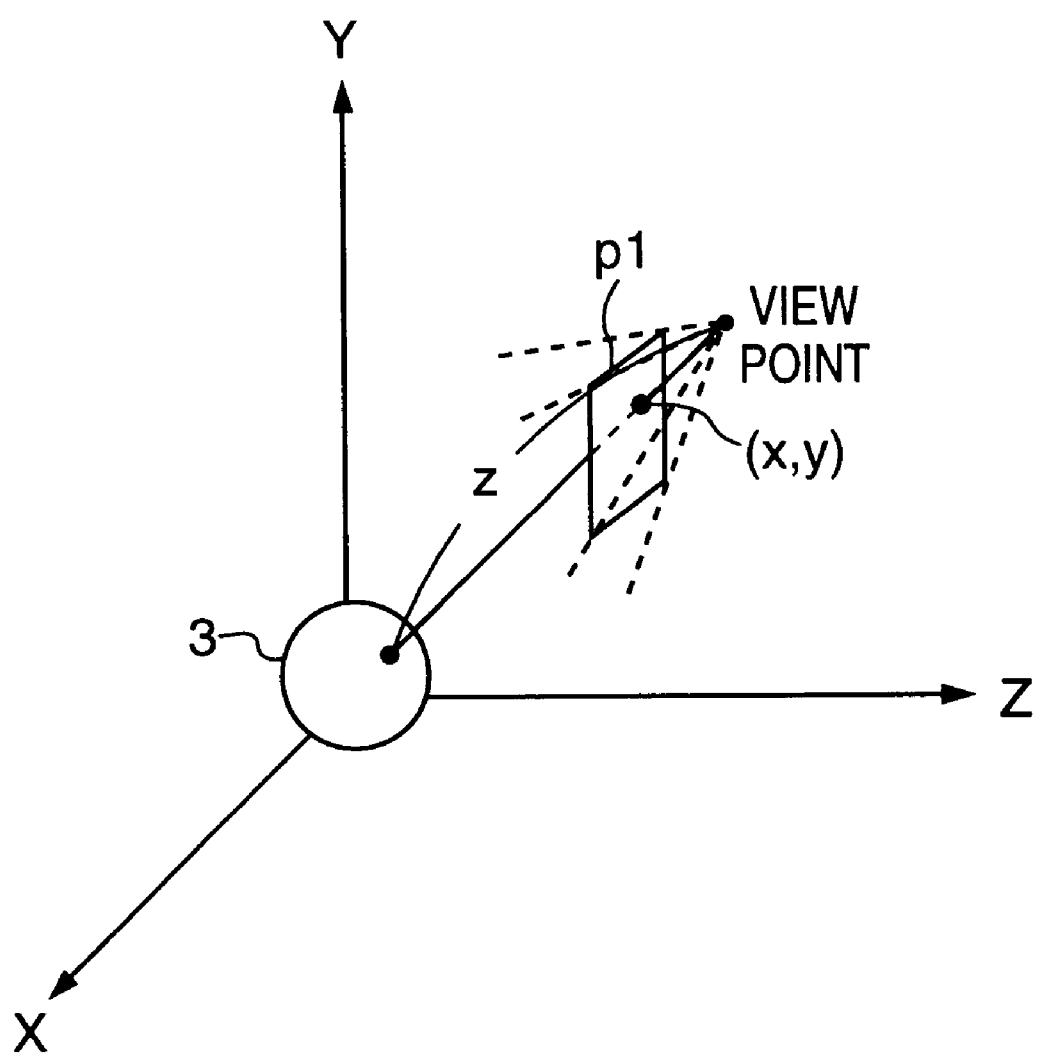
FIG. 15 is an explanatory view for explaining the processing of a three-dimensional model forming unit.

The three-dimensional model forming unit 55 forms a three-dimensional model of the object 3 to be measured using the distance image data output from the distance distribution extraction unit 54 and the parameter SP data. The three-dimensional model of the object 3 to be measured in this embodiment projects the surface shape of an object onto a projection surface p1, and has distances z and pixel values in units of regions of two-dimensional orthogonal coordinates (x, y), as shown in FIG. 15. The projection surface p1 is defined by the view point position of the projection surface, the distance and direction from the view point, and is designated by the input device 13. The projection surface p1 is defined to be able to cover a field of view broader than the image sensing region of the image sensing lens 21.

The distance data are coordinate-converted by the three-dimensional model write address calculation unit 551 on the basis of the parameter SP data, i.e., the view point position, view point moving amount, and optical axis rotation amount, the parameters of the view point position, and the distance and direction from the view point, which define the projection surface p1, and pixel values are written at addresses corresponding to regions (x, y) of the three-dimensional model storage unit 552. At this time, counters corresponding to the respective storage areas are incremented. When the next distance image data are input from the distance distribution extraction unit 54, and the converted data are written in the already stored area, the average value of data is stored as new three-dimensional model data of the object 3 to be measured with reference to the value of each counter. In this manner, the three-dimensional model of the object 3 to be measured is formed by sequentially adding the data of the three-dimensional model to the three-dimensional model storage unit 552 while the shutter signal S4 supplied to the camera processing device 5 via the input interface unit 51 is ON.

The 3D display image generation unit 56 converts the three-dimensional model data of the object 3 to be measured into a two-dimensional display image. In this embodiment, the image generation unit 562 directly generates a display image based on data in the three-dimensional model storage unit 552. Therefore, the 3D display image generation unit 56 does not have the arrangement shown in FIG. 9, but performs control for transferring data in the three-dimensional model storage unit 552 in FIG. 8 to the processing device 11 in the computer 1. Since the projection surface p1 is defined to be able to cover a field of view broader than the image sensing region of the image sensing lens 21, an image obtained as a result of acquiring three-dimensional data in the broad field of view is displayed on the panorama window 35 of the display device 12.

The user observes this display image, and completes the input operation if he or she confirms that the desired three-dimensional data are obtained. The three-dimensional model write control unit 553 controls the writing of the three-dimensional model of the object 3 to be measured formed in the three-dimensional model storage unit 552 in the storage device 14 of the computer 1 when the shutter signal S4 changes from the ON state to the OFF state.

As described above, according to the first and second embodiments, the distance distribution of an object is extracted using a plurality of images that are sensed at a plurality of image sensing positions so that the respective images of the object partially overlap each other and also using the detection positions of the respective image sensing positions. A three-dimensional model of the object is formed using the extracted distance distribution, the sensed images, and the detection positions, and a two-dimensional image is generated and displayed based on the three-dimensional model. Hence, the image input operation can be performed while sequentially monitoring the extracted three-dimensional shape of the object without requiring any cumbersome setting operations, thus efficiently obtaining a required portion of the three-dimensional shape of the object.

According to the first embodiment, since the three-dimensional model is described using parameters of pixel values and radial component of the three-dimensional polar coordinate system at addresses designated by two angle parameters, a display suitable for obtaining the three-dimensional shape of nearly the entire surface of a relatively small object can be attained, and the image input operation is facilitated.

According to the second embodiment, since the three-dimensional model is formed by describing pixel values and object distances obtained from the distance distribution by the perspective transformation at addresses designated by the two-dimensional orthogonal coordinate system, a display suitable for obtaining the three-dimensional distribution of the surface of a relatively large object over a broad range can be attained, and the image input operation is facilitated.

Many widely different embodiments of the present invention can be made without departing from the spirit and scope thereof: it is to be understood that the invention is not limited to the specific embodiments thereof except as defined in the appended claims.

What is claimed is:

1. A three-dimensional model data forming apparatus for forming three-dimensional model data of an object sensed by image sensing means, comprising:

first detection means for detecting an image sensing position of said image sensing means;

second detection means for detecting a lens position of said image sensing means;

calculation means for calculating a parameter on the basis of outputs from said first and second detection means;

distance distribution extraction means for extracting a distance distribution of the object on the basis of a plurality of images which are sensed by said image sensing means at a plurality of image sensing positions so that the respective images of the object partially overlap each other, and the parameter calculated by said calculation means;

three-dimensional model data forming means for forming the three-dimensional model data of the object on the basis of the distance distribution extracted by said distance distribution extraction means, the plurality of images, and the parameter;

two-dimensional image generation means for generating a two-dimensional image on the basis of the three-dimensional model data output from said three-dimensional model data forming means; and monitoring means for displaying the two-dimensional image and for designating the displayed two-dimensional image corresponding to a part shape of the object, so that it is possible to visually monitor a forming process for forming three-dimensional model data corresponding to a desired portion of the three-dimensional shape of the object.

2. The apparatus according to claim 1, wherein said three-dimensional model data forming means describes the three-dimensional model data using parameters of a pixel value and a radial component of a three-dimensional polar coordinate system with respect to an address designated by two angle parameters of the three-dimensional polar coordinate system.

3. The apparatus according to claim 2, wherein said two-dimensional image generation means describes the three-dimensional model data at an address designated by a two-dimensional model at an address designated by a two-dimensional orthogonal coordinate system by performing a viewing transformation on the basis of directions of coordinate axes of a coordinate system, a view point position, and a visual axis direction of a display image, which are set in advance, and the parameters of the pixel value and the radial component of the three-dimensional polar coordinate system.

4. The apparatus according to claim 1, wherein said calculation means calculates view point position data, view point moving amount data, and optical axis rotation amount data in accordance with the outputs from said first and second detection means.

5. The apparatus according to claim 4, wherein said calculation means calculates the view point moving amount data and the optical axis rotation amount data in accordance with the output from said first detection means and predetermined view point conversion data.

6. The apparatus according to claim 4, wherein said calculation means calculates the view point position data on the basis of the output from said second detection means and predetermined view point position correction data.

7. The apparatus according to claim 1, wherein said distance distribution extraction means extracts a predetermined object from each of the plurality of images, and extracts the distance distribution with respect to the extracted object.

8. The apparatus according to claim 1, wherein said monitoring means is also for displaying the image sensed by said image sensing means together with the two-dimensional image.

9. The apparatus according to claim 1, wherein said distance distribution extraction means performs matching processing of corresponding points between two image data.

10. The apparatus according to claim 9, wherein said distance distribution extraction means calculates a distance to the object on the basis of a pair of corresponding points obtained by the matching processing and the parameter.

11. The apparatus according to claim 1, wherein said distance distribution extraction means extracts a predetermined object from each of the plurality of images, and performs matching processing of corresponding points between the two extracted objects.

12. The apparatus according to claim 11, wherein said distance distribution extraction means calculates a distance to the object on the basis of a pair of corresponding points obtained by the matching processing and the parameter.

13. The apparatus according to claim 1, wherein said three-dimensional model data forming means converts the distance distribution into polar coordinates on the basis of the parameter.

14. The apparatus according to claim 13, further comprising storage means for storing the distance distribution using a coordinate value of the polar coordinates as an address.

15. A method of forming three-dimensional model data of an object sensed by image sensing means, comprising the steps of:

first detection step of detecting an image sensing position of said image sensing means;

second detection step of detecting a lens position of said image sensing means;

calculation step of calculating a parameter on the basis of outputs from said first and second detection steps;

extraction step of extracting a distance distribution of the object on the basis of a plurality of images which are sensed by said images sensing means at a plurality of image sensing positions so that the respective images of the object partially overlap each other, and the parameter calculated by said calculation step;

forming step of forming three-dimensional model data of the object on the basis of the distance distribution extracted by said extraction step, the plurality of images, and the parameter;

generation step of generating a two-dimensional image of the basis of the three-dimensional model data formed in said forming step; and monitoring step of displaying the two-dimensional image and of designating the displayed two-dimensional image corresponding to a part shape of the object, so that it is possible to visually monitor a forming process for forming three-dimensional model data corresponding to a desired portion of the three-dimensional shape of the object.

16. The method according to claim 15, wherein said forming step describes the three-dimensional model data using parameters of a pixel value and a radial component of a three-dimensional polar coordinate system with respect to an address designated by two angle parameters of the three-dimensional polar coordinate system.

17. The method according to claim 16, wherein said generation step describes the three-dimensional model data at an address designated by a two-dimensional orthogonal coordinate system by performing a viewing transformation on the basis of directions of coordinate axes of a coordinate system, a view point position, and a visual axis direction of a display image, which are set in advance, and the parameters of the pixel value and the radial component of the three-dimensional polar coordinate system.

18. The method according to claim 15, wherein said calculation step calculates view point position data, view point moving amount data, and optical axis rotation amount data in accordance with the detected results in said first and second detection steps.

19. The method according to claim 18, wherein said calculation step calculates the view point moving amount data and the optical axis rotation amount data in accordance with the detected results in said first detection steps and predetermined view point conversion data.

20. The method according to claim 17, wherein said calculation step calculates the view point position data on the basis of the detected result in said second detection step and predetermined view point position correction data.

21. The method according to claim 15, wherein said extraction step extracts a predetermined object from each of the plurality of images, and extracts the distance distribution with respect to the extracted object.

22. The method according to claim 15, wherein said monitoring step also displays the image sensed by said image sensing means together with the two-dimensional image.

23. The method according to claim 15, wherein said extraction step performs matching processing of corresponding points between two image data.

24. The method according to claim 23, wherein said extraction step calculates a distance to the object on the basis of a pair of corresponding points obtained by the matching processing and the parameter.

25. The method according to claim 15, wherein said extraction means extracts a predetermined object from each of the plurality of images, and performs matching processing of corresponding points between the two extracted objects.

26. The method according to claim 25, wherein said extraction step calculates a distance to the object on the basis of a pair of corresponding points obtained by the matching processing and the parameter.

27. The method according to claim 15, wherein said forming step converts the distance distribution into polar coordinates on the basis of the parameter.

28. The method according to claim 27, further comprising storage step of storing the distance distribution using a coordinate value of the polar coordinates as an address.

29. A three-dimensional model data processing apparatus for processing three-dimensional model data of an object sensed by image sensing means, comprising;

first input means for inputting an image sensing position of said image sensing means;

second input means for inputting operating state information of said image sensing means;

calculation means for calculating a parameter on the basis of outputs from said first and second detection means;

distance distribution detecting means for detecting a distance distribution of the object on the basis of a plurality of images which are sensed by said image sensing means at a plurality of image sensing positions so that the respective images of the object partially overlap each other, the parameter calculated by said calculation means;

three-dimensional model data forming means for forming a three-dimensional model data of the object on the basis of the distance distribution detected by said distance distribution detecting means, the plurality of images, and the parameter;

two-dimensional image generation means for generating a two-dimensional image on the basis of the three-dimensional model data output from said three-dimensional model data forming means; and monitoring means for displaying the two-dimensional image and for designating the displayed two-dimensional image corresponding to a part shape of the object, so that it is possible to visually monitor a processing for forming three-dimensional model data corresponding to a desired portion of the three-dimensional shape of the object.

30. The apparatus according to claim 29, wherein said three-dimensional model data forming means describes the three-dimensional model data using parameters of a pixel value and a radial component of a three-dimensional polar coordinate system with respect to an address designated by two angle parameters of the three-dimensional polar coordinate system.

31. The apparatus according to claim 30, wherein said two-dimensional image generation means describes the three-dimensional model data at an address designated by a two-dimensional orthogonal coordinate system by performing a viewing transformation on the basis of directions of coordinate axes of a coordinate system, a view point position, and a visual axis direction of a display image, which are set in advance, and the parameters of the pixel value and the radial component of the three-dimensional polar coordinate system.

32. The apparatus according to claim 29, wherein said calculation means calculates view point position data, view point moving amount data, and optical axis rotation amount data in accordance with the outputs from said first and second input means.

33. The apparatus according to claim 32, wherein said calculation means calculates the view point moving amount data and the optical axis rotation amount data in accordance with the output from said first input means and predetermined view point conversion data.

34. The apparatus according to claim 32, wherein said calculation means calculates the view point position data on the basis of the output from said second input means and predetermined view point position correction data.

35. The apparatus according to claim 29, wherein said monitoring means is also for displaying the image sensed by said image sensing means together with the two-dimensional image.

36. The apparatus according to claim 29, wherein said distance distribution detecting means performs matching processing of corresponding points or images between two image data and calculates a distance to the object on the basis of a pair of corresponding points obtained by the matching processing and the parameter.

37. The apparatus according to claim 29, wherein said three-dimensional model data processing means converts the distance distribution into polar coordinates on the basis of the parameter.

* * * * *

UNITED STATES PATENT AND TRADEMARK OFFICE
CERTIFICATE OF CORRECTION

PATENT NO.    : 6,031,941
DATED         : February 29, 2000
INVENTOR(S)   : Kotaro Yano et al.

It is certified that error appears in the above-identified patent and that said Letters Patent is hereby corrected as shown below:

Delete specification, cols. 1-18 and substitute therefore the specification, cols. 1-18 as shown on the attached pages.

Signed and Sealed this

Twenty-fourth Day of August, 2004

JON W. DUDAS
*Director of the United States Patent and Trademark Office*

THREE-DIMENSIONAL MODEL DATA FORMING APPARATUS

BACKGROUND OF THE INVENTION

The present invention relates to a three-dimensional shape extraction apparatus for obtaining three-dimensional information of an object or environment required for forming a stereoscopic model for CG or CAD from a two-dimensional image.

As a conventional technique for obtaining the three-dimensional shape of an object, a technique described in Journal of Television Society, Vol. 45, No. 4 (1991), pp. 453–460, is known. As described in this reference, the method of obtaining the three-dimensional shape of an object is roughly classified into passive and active methods. One typical passive method is stereoscopic imaging, that performs trigonometric measurements using two cameras. In this method, the positions of images of an identical object are detected from the right and left images, and the three-dimensional position of the object is measured based on the displacement amount between the two positions. As typical active methods, an optical radar type range finder which obtains the distance by measuring the time until light projected toward and reflected by an object returns, a slit light projection method for projecting a slit-shaped optical pattern onto an object, and measuring the three-dimensional shape on the basis of the displacement of the pattern shape formed on the object, and the like are known.

However, in the above-mentioned stereoscopic image method, a large-scale apparatus is required, and since the two cameras must be aligned with high precision, the setting operation is difficult. In addition, since the three-dimensional shape cannot be obtained for a hidden region which is not seen in an image such as the back surface of an object, the cumbersome setting operation must be redone. Therefore, it is very difficult to obtain a required portion of the three-dimensional shape of an object. In the active method, since some energy such as light is irradiated onto an object, if the distance to the object is large, the intensity of the energy must be increased, resulting in an increase in consumption power.

It is, therefore, the first object of the invention to provide a three-dimensional shape extraction apparatus which can efficiently obtain a required portion of the three-dimensional shape of an object by a passive method without performing any cumbersome setting operation.

It is the second object of the invention to provide a three-dimensional shape extraction apparatus which can perform display suitable for obtaining the three-dimensional shape on nearly the entire surface of a relatively small object.

It is the third object of the invention to provide a three-dimensional shape extraction apparatus which can perform display suitable for obtaining the three-dimensional distribution of the surface of a relatively large object over a broad range.

SUMMARY OF THE INVENTION

The present invention is characterized by the following arrangement. That is, a three-dimensional shape extraction apparatus for extracting the three-dimensional shape of an object sensed by image sensing means, comprises first detection means for detecting the image sensing position of the image sensing means, second detection means for detecting the lens position of the image sensing means, calculation means for calculating a predetermined parameter on the basis of the outputs from the first and second detection means, distance distribution extraction means for extracting the distance distribution of the object using a plurality of images sensed by the image sensing means at a plurality of image sensing positions so that the respective images of the object partially overlap each other, and the calculated parameter, three-dimensional model forming means for forming a three-dimensional model of the object using the distance distribution obtained from the distance distribution extraction means, the plurality of images obtained from the image sensing means, and the parameter, and two-dimensional image generation means for generating a two-dimensional image on the basis of the output from the three-dimensional model forming means.

According to the present invention, the distance distribution extraction means obtains the distance distribution of the object on the basis of a plurality of images sensed at a plurality of image sensing positions, so that the respective images of the object partially overlap each other, and detection position information obtained by detecting the respective image sensing positions. The three-dimensional model forming means combines the distance distributions obtained in turn and the sensed images using the detection positions, thereby forming the three-dimensional model of the object. A stereoscopic two-dimensional image can be displayed based on the three-dimensional model.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

Figure 10A:
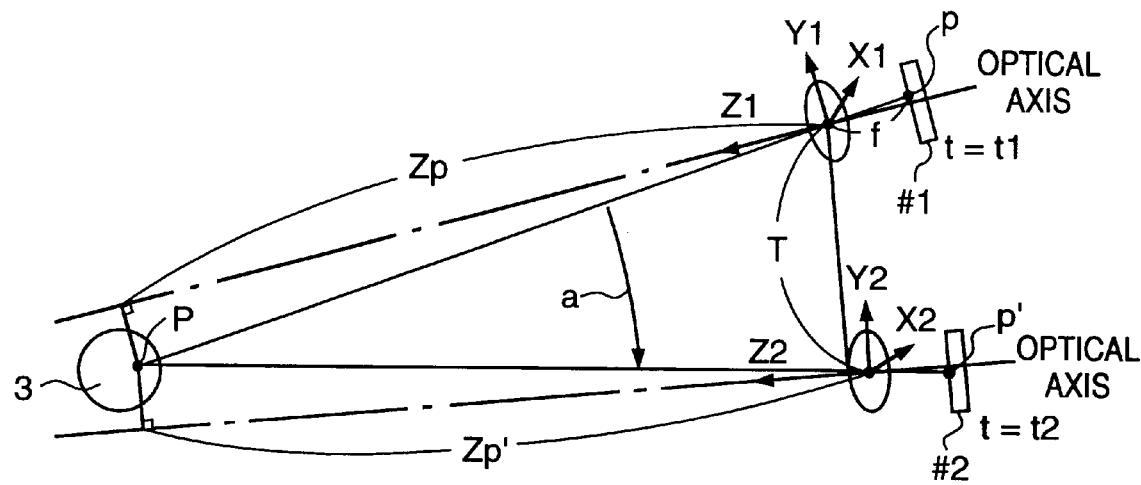
FIGS. 10A and 10B are explanatory views for explaining the matching processing according to the first embodiment of the present invention.
Figure 10B:
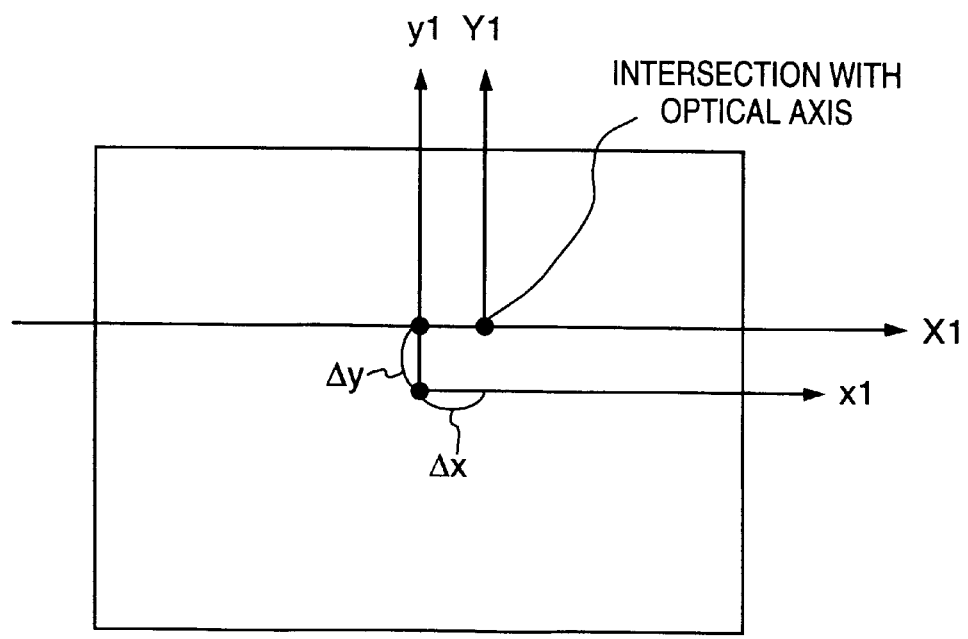
Figure 12:
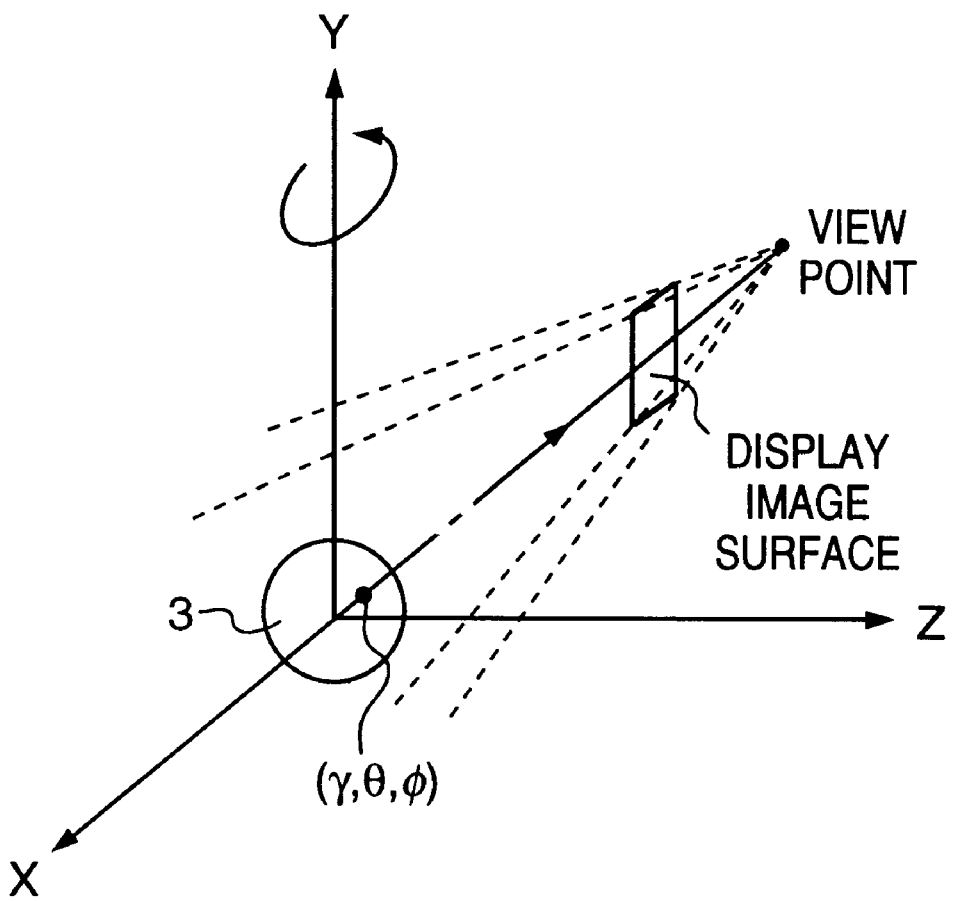
FIG. 12 is an explanatory view for explaining the perspective transformation of the 3D display image generation unit according to the first embodiment of the present invention.

FIG. 1 is a schematic perspective view showing a three-dimensional shape extraction apparatus according to the first embodiment of the present invention;

FIG. 2 is a block diagram showing the basic arrangement of the three-dimensional shape extraction apparatus according to the first embodiment of the present invention;

FIG. 3 is a schematic view showing a display example upon inputting an image according to the first embodiment of the present invention;

FIG. 4 is a block diagram showing the arrangement of a camera according to the first embodiment of the present invention;

FIG. 5 is a schematic block diagram showing the arrangement of a camera processing device according to the first embodiment of the present invention;

FIG. 6 is a block diagram showing the arrangement of a parameter calculation unit according to the first embodiment of the present invention;

FIG. 7 is a block diagram showing the arrangement of a distance distribution extraction unit according to the first embodiment of the present invention;

FIG. 8 is a block diagram showing the arrangement of a three-dimensional model forming unit according to the first embodiment of the present invention;

FIG. 9 is a block diagram showing the arrangement of a 3D display image generation unit according to the first embodiment of the present invention;

FIGS. 10A and 10B are explanatory views for explaining the matching processing according to the first embodiment of the present invention;

FIG. 11 is an explanatory view for explaining the processing of the three-dimensional model forming unit according to the first embodiment of the present invention;

FIG. 12 is an explanatory view for explaining the perspective transformation of the 3D display image generation unit according to the first embodiment of the present invention;

FIG. 13 is a schematic view showing the image input state according to the second embodiment of the present invention;

FIG. 14 is a schematic view showing a display example upon inputting an image according to the second embodiment of the present invention; and FIG. 15 is an explanatory view for explaining the processing of a three-dimensional model forming unit.

DESCRIPTION OF THE PREFERRED EMBODIMENTS.

First Embodiment

The first embodiment of the present invention will be described hereinafter. The operation of a three-dimensional shape extraction apparatus of this embodiment will be briefly explained below with reference to FIGS. 1 to 3.

FIG. 1 shows the concept of the three-dimensional shape extraction method in a three-dimensional shape extraction apparatus according to the first embodiment of the present invention. As shown in FIG. 1, a user inputs an image while scanning a camera 2 connected to a computer 1 that performs graphics processing, CAD processing, or the like around an object 3 to be measured in the direction of an arrow a. Note that the camera 2 is movably set on a panpod (not shown) or the like. FIG. 2 is a block diagram showing the basic arrangement of the apparatus. The computer 1 comprises a processing device 11 for performing arithmetic processing and graphics processing, a display device 12 such as a CRT for displaying an image and the like, an input device 13 such as a keyboard, mouse, or the like, which is used for inputting commands and the like, and a storage device 14 such as an IC memory, a hard disk device, or the like. Furthermore, the computer 1 comprises a camera processing device 5 for performing processing (to be described in detail later) associated with the camera 2. An explanation of this embodiment will be given below on the basis of the arrangement shown in FIGS. 1 and 2. For example, the camera processing device 5 may be arranged in the camera 2, or the processing device 11 may realize the processing of the camera processing device 5 in accordance with its internal program.

The three-dimensional shape is input by starting an image input program on the computer 1. When the user starts the image input program by inputting a command from the input device 13, a window (to be referred to as a finder window or simply as a window hereinafter) 32 corresponding to the finder of the camera is generated on the display device 12 of the computer 1. When the user turns on the switch of the camera 2, an image sensed by the camera 2 is directly displayed within the window 32. The user determines framing while observing the displayed image, so that the object 3 to be measured is located at nearly the center of the window, and thereafter, he or she presses a shutter. The user moves the camera 2 in the direction of the arrow a, and presses the shutter several times during the movement, thus scanning the object 3 to be measured. With this operation, image data of the object 3 to be measured sensed from a plurality of view points are acquired. When the plurality of image data are processed by the camera processing device 5 and the processing device 11, three-dimensional data of the object 3 to be measured is obtained. In the plurality of image sensing operations upon movement of the camera 2, the respective sensed images must include overlapping portions to allow image synthesis processing to be described later.

Upon executing the scanning, when the user presses the shutter, a window (to be referred to as a 3D display window hereinafter) 33 for displaying a three-dimensional model of the object 3 to be measured is simultaneously generated, and an image representing the three-dimensional model of the object 3 to be measured is displayed in succession on the 3D display window 33 in the order of acquired three-dimensional data of the object 3 to be measured. FIG. 3 shows a display example of a display screen 31 of the display device 12 of the computer 1. The user observes the image on the 3D display window 33, and completes the input operation if he or she confirms that a desired three-dimensional model of the object 3 to be measured is obtained. Note that FIG. 3 shows the state wherein an intermediate three-dimensional shape of the object 3 to be measured is displayed on the 3D display window 33.

The arrangement and operation of this embodiment will be described in more detail below.

Internal Arrangement of Camera

FIG. 4 is a block diagram showing the arrangement of the camera 2. Reference numeral 21 denotes an image sensing lens for sensing an image of the object 3 to be measured; 22, an image sensor such as a CCD for fetching an image as an electrical signal; and 23, a sample & hold (S/H) circuit for holding the electrical signal output from the image sensor 22, and outputting it as an image signal S1. The image sensor 22 is adjusted so that the center of its detection image region nearly crosses the optical axis of the image sensing lens 21, and its detection surface is nearly perpendicular to the optical axis of the image sensing lens 21. Reference numeral 24 denotes a focus detection device used in, e.g., an auto-focusing mechanism of a camera. The focus detection device 24 projects infrared rays from an LED (not shown) toward an object, receives reflected light returning to the camera using a line sensor, and detects the focal point position on the basis of the light-receiving position.

Reference numeral 25 denotes a lens driving unit such as a pulse motor and the like. The lens driving unit 25 drives the image sensing lens 21 in a direction parallel to the optical axis to attain focusing. Reference numeral 26 denotes a lens driving circuit which controls the lens driving unit 25 in accordance with a focal point position detection signal from the focus detection device 24, and outputs a lens position signal S2. Reference numeral 27 denotes a camera displacement detection device constituted by an angular velocity sensor such as an acceleration sensor, a vibration gyro, or the like, an integrator, and the like. The camera displacement detection device 27 detects the displacement of the camera position and posture, and outputs it as a camera displacement signal S3. The axis of the detection rotation angle of the camera displacement detection device 27 is adjusted to roughly agree with the optical axis of the image sensing lens 21, and the horizontal and vertical axes of the image sensor 22. The origin of these three coordinate axes nearly matches the central position of the camera displacement detection device 27. Reference numeral 28 denotes a shutter for outputting a shutter signal S4. Reference numeral 29 denotes an interface unit for parallelly transferring the output signals S1 to S4 from the camera to the camera processing device 5.

Internal Arrangement of Camera Processing Device

The arrangement of the camera processing device 5 will be explained below.

FIG. 5 is a schematic block diagram showing the arrangement of the camera processing device 5. The arrangement and operation of the camera processing device 5 will be briefly described below with reference to FIG. 5. Reference numeral 51 denotes an input interface unit for receiving the image signal S1, the lens position signal S2, the camera displacement signal S3, and the shutter signal S4 sent from the camera 2, and distributing them to the respective units, as shown in FIG. 5. Reference numeral 52 denotes an image data construction unit for processing the image signal S1. The image data construction unit is constituted by an auto gain control circuit, a gamma correction circuit, and an A/D converter. The image data construction unit 52 performs the automatic gain control of the image signal S1 using the auto gain control circuit, and then performs gradation correction of the output signal using the gamma correction circuit. Thereafter, the output signal from the gamma correction circuit is converted into digital image data by the A/D converter, and the digital image data is output.

Reference numeral 53 denotes a parameter calculation unit for outputting parameter SP data including the view point position [the view point position is the position from the center of a digital image obtained from the image sensor 22 at the principal point (to be referred to as a view point hereinafter) of the image sensing lens 21 according to the value of the lens position signal S2, and represents the optical layout of the image sensing system including the image sensing lens 21 and the image sensor 22], the view point moving amount, and the optical axis rotation amount, which are the parameters upon image sensing, on the basis of the lens position signal S2 and the camera displacement signal S3 as the output signals from the camera 2. Reference numeral 54 denotes a distance distribution extraction unit for obtaining the distance distribution in the overlapping portion of the object on the basis of two sets of image data sensed at different view point positions, i.e., image data obtained at times t and t', that are outputs from the image data construction unit 52, and the parameter SP data output from the parameter calculation unit 53.

Reference numeral 55 denotes a three-dimensional model forming unit for sequentially forming a three-dimensional model of the object 3 to be measured on the basis of the distance distribution output from the distance distribution extraction unit 54, the image data, and the parameter SP data output from the parameter calculation unit 53. Reference numeral 56 denotes a 3D display image generation unit for generating an image to be displayed on the 3D display window on the basis of the three-dimensional model of the object 3 to be measured formed by the three-dimensional model forming unit 55.

The respective blocks of the camera processing device 5 will be described in detail below with reference to FIGS. 6 to 9.

FIG. 6 shows the arrangement of the parameter calculation unit 53. Reference numeral 531 denotes a lens information storage unit for storing information such as the focal length and the like inherent to the image sensing lens 21. Reference numeral 532 denotes a view point position calculation circuit for calculating the view point position on the basis of the lens position signal S2 and the data stored in the lens information storage unit 531. Reference numeral 533 denotes a view point displacement calculation circuit for calculating the view point moving amount and the optical axis rotational displacement amount of the image sensing lens 21 on the basis of the camera displacement signal S3 and the data stored in the lens information storage unit 531. Reference numeral 534 denotes a parameter output unit for outputting the data of the view point position, view point moving amount, and optical axis rotation amount as the parameter SP data upon image sensing.

FIG. 7 shows the arrangement of the distance distribution extraction unit 54. Reference numeral 541 denotes an object region extraction unit, which extracts the region of an object (the object 3 to be measured in this case) present in the sensed image from image data input from the image data construction unit 52, and generating an object image of only the extracted object region. Reference numeral 542 denotes an image storage unit for temporarily storing the object image output from the object region extraction unit 541. Reference numeral 543 denotes a matching processing unit, which performs matching between the object image currently extracted by the object region extraction unit 541 on the basis of the two sets of image data, and the previous object image already stored in the image storage unit 542 by utilizing the parameter SP data, i.e., the view point position, view point moving amount, and the optical axis rotation amount. Reference numeral 544 denotes a distance calculation unit, which calculates the distance to the object on the basis of the parameter SP data, i.e., the view point position, view point moving amount, and optical axis rotation amount, and a pair of corresponding points output from the matching processing unit 543. Note that the pair of corresponding points are a pair of a certain pixel in image data at time t, and a pixel corresponding to the former pixel and present in image data at time t'. These pixels should physically correspond to an identical portion on the object. Reference numeral 545 denotes a distance image data output unit for outputting a combination of the image data and the distance data output from the distance calculation unit 544. These processing operations are performed while sequentially updating data every time the shutter is pressed.

FIG. 8 shows the arrangement of the three-dimensional model forming unit 55. Reference numeral 551 denotes a three-dimensional model write address calculation unit for converting the distance data into polar coordinate data using the parameter SP data, i.e., the view point position, view point moving amount, and optical axis rotation amount. Reference numeral 552 denotes a three-dimensional model storage unit for writing and storing image data at the address corresponding to the coordinate value of the polar coordinate data as the output from the three-dimensional model write address calculation unit 551. Reference numeral 553 denotes a three-dimensional model write control unit for performing write control of the three-dimensional model data of the object 3 to be measured stored in the three-dimensional model storage unit 552 in the storage device 14.

FIG. 9 shows the arrangement of the 3D display image generation unit 56. Reference numeral 561 denotes a coordinate system parameter setting unit for setting the directions of the coordinate axes of the coordinate system, the view point position, and the visual axis direction of the image to be displayed. Reference numeral 562 denotes an image generation unit for reading out the three-dimensional model data of the object from the three-dimensional model storage unit 552 in accordance with the parameters of the coordinate system parameter setting unit 561 and generating a display image.

Operation of Camera and Camera Processing Device

The operations of the camera 2 and the camera processing device 5 upon inputting an image while scanning the camera 2 around the object 3 to be measured will be described below.

When the image input program of the computer 1 is started, the processing device 11 in the computer 1 generates a finder window and displays it on the display device 12. An image fetched via the image sensing lens 21 in the state wherein the power switch of the camera 2 is ON is supplied as an image signal S1 to the camera processing device 5 via the image sensor 22, the S/H circuit 23, and the interface unit 29. The image signal S1 is received by the input interface unit 51 of the camera processing device 5, and is output as digital image data via the image data construction unit 52. The digital image data is written in an internal graphic memory of the processing device 11 in the computer 1, and the processing device 11 displays this image on the finder window 32 of the display device 12.

During this interval, the focus detection device 24 always detects the defocus amount in a region corresponding to nearly the center of the image sensing frame of the image sensor 22, and the lens driving circuit 26 drives the lens driving unit 25 in accordance with a signal detected by the focus detection device 24. The lens driving unit 25 drives the image sensing lens 21 to attain an in-focus state. At this time, the lens driving circuit 26 supplies the signal for controlling the lens driving unit 25 to the camera processing device 5 via the interface unit 29 as a lens position signal S2. The lens position signal S2 supplied at that time represents the extended amount of the image sensing lens 21 from its reference position. With the above-mentioned operation, the image fetched via the image sensing lens 21 is directly displayed on the finder window 32.

The user determines framing while observing the displayed image, and then presses the shutter 28. Upon pressing the shutter 28, the lens driving circuit 26 controls the lens driving unit 25 not to drive the image sensing lens 21, thereby fixing the focal point position of the image sensing lens 21. A shutter signal S4 from the shutter 28 is supplied to the camera processing device 5 via the interface unit 29.

On the other hand, the camera displacement detection device 27 always detects the displacement of the position and posture of the camera 2 while the power switch of the camera 2 is ON, and supplies a camera displacement signal S3 to the camera processing device 5 via the interface unit 29. The lens position signal S2 supplied to the camera processing device 5 is supplied to the view point position calculation circuit 532 in the parameter calculation unit 53 via the input interface unit 51. The view point position calculation circuit 532 obtains the view point position by reading out a view point position correction table stored in the lens information storage unit 531 in accordance with the value of the lens position signal S2. More specifically, the view point position correction table stored in the lens information storage unit 531 stores view point position data from the central position of a digital image obtained from the image sensor 22 when the image sensing lens 21 is located at the extended position according to the value of the lens position signal S2. The view point position data has three components, i.e., an optical axis direction component f of the image sensing lens 21, and horizontal and vertical direction components ($\Delta x$, $\Delta y$) of the image sensor 22 perpendicular thereto. Ideally, f nearly equals the focal length of the image sensing lens 21, and ($\Delta x$, $\Delta y$) nearly equals 0.

The camera displacement signal S3 supplied to the camera processing device 5 is supplied to the view point displacement calculation circuit 533 in the parameter calculation unit 53 via the input interface unit 51. The camera displacement signal S3 supplied from the camera 2 represents the information of the positional displacement and angular displacement in the coordinate system that can be determined by three orthogonal coordinate axes having the center of the camera displacement detection device 27 as the origin. The view point displacement calculation circuit 533 performs a matrix calculation using this camera displacement signal S3 and view point conversion data stored in the lens information storage unit 531, thereby calculating a positional displacement T (to be referred to as a view point moving amount hereinafter) and an angular displacement R (to be referred to as an optical axis rotation amount hereinafter) in the coordinate system that can be determined by the optical axis of the image sensing lens 21 and the horizontal and vertical axes of the image sensor 22 to have the intersection of the detection surface of the image sensor 22 with the optical axis of the image sensing lens 21 as the origin.

More specifically, the processing of the view point displacement calculation circuit 533 can correct the displacements between the origins and coordinate axes of the camera displacement detection device 27 and the image sensing lens 21. Therefore, the lens information storage unit 55 stores a conversion matrix for converting the camera displacement signal S3 detected by the camera displacement device 27 into the view point moving amount and the optical axis rotation amount as view point conversion data. The view point position data, the view point moving amount data, and the optical axis rotation amount data are combined as the parameter SP data of the parameter calculation unit 53 in the parameter output unit 534.

The distance distribution extraction unit 54 extracts the distance distribution of the object 3 to be measured from two sets of digital image data obtained at different times $t=t_1$ and $t=t_2$ and the parameter SP data (view point position data, view point moving amount data, and optical axis rotation amount data) as a result of the above-mentioned processing. Image data input from the image data construction unit 52 is converted into an object image of only the object region by the object region extraction unit 541. The object region extraction unit 541 detects the edge of the input image data to divide the image into small regions, and re-combines regions into an object region and a background pattern region by utilizing features such as luminance level, texture, and the like, thereby obtaining the object image of only the object region. The object image data is temporarily stored in the image storage unit 542. When the object region extraction unit 541 obtains only an object image from the image data input at the next time, the matching processing unit 543 performs matching between the object image data (to be referred to as image #2 hereinafter) output from the object region extraction unit 541, and the object image data (to be referred to as image #1 hereinafter) stored in the image storage unit 542 by utilizing the parameters, i.e., the view point position, the view point moving amount, and the optical axis rotation amount.

In general, feature points in two sets of images sensed by a camera can have a one-to-one correspondence therebetween on the basis of the view point position, the view point moving amount, the optical axis rotation amount, and the object distance. More specifically, this relationship will be explained below with reference to FIGS. 10A and 10B. A point P on the object 3 to be measured corresponding to a point p at time $t=t_1$ is obtained by the view point position f, ($\Delta x$, $\Delta y$), and an object distance $Zp$. The point P on the object 3 to be measured is coordinate-converted using the view point moving amount T and the optical axis rotation amount R, and then, a point p' at time $t=t_2$ as another image point is obtained by the view point position f, ($\Delta x$, $\Delta y$), and an object distance $Zp'$.

The matching processing unit 543 calculates points corresponding to upper and lower limit values serving as standards set in advance as the object distance, view point moving amount, and optical axis rotation amount on the basis of these upper and lower limit values, and determines a matching candidate region within the range of the calculated points. Then, the unit 543 performs matching processing in the determined region. At this time, a small region of the object region of image #1 is extracted as a template, and the extracted template is translated by giving a position offset thereto, so as to perform template matching with image data within the range of the possible matching region of image #2, thereby detecting coordinates $(x_2, Y_2)$ of image #2 corresponding to coordinates $(x_1, y_1)$ of image #1. The template matching processing is repeated in correspondence with the image data (pixels) of the object region of image #1, thereby outputting corresponding points between pixels in the object regions of images #1 and #2.

The distance calculation unit 544 calculates the distance using the parameter SP data, i.e., the view point position, the view point moving amount, and the optical axis rotation amount, and pairs of corresponding points as the output from the matching processing unit 543. The distance calculation method will be described below. Let $x_1 y_1$ and $X_1 Y_1 Z_1$ be the coordinate system of the image surface and the spatial coordinate system of image #1; $x_2 y_2$ and $X_2 Y_2 Z_2$ be the coordinate system of the image surface and the spatial coordinate system of image #2; and $(\Delta X, \Delta Y, \Delta Z)$ and $(\Delta \alpha, \Delta \beta, \Delta \gamma)$ be the view point moving amount T and the optical axis rotation amount R. Note that the components $\Delta X$, $\Delta Y$, and $\Delta Z$ of the view point moving amount respectively represent the moving amounts in the $X_1$, $Y_1$, and $Z_1$ directions, and the components $\Delta \alpha$, $\Delta \beta$, and $\Delta \gamma$ respectively represent the rotation angles about the $X_1$, $Y_1$, and $Z_1$ axes. Then, the relationship between the coordinate system of the image surface and the spatial coordinate system of image #1 is given by:

$$\frac{f}{z_1}\begin{pmatrix} X_1 \\ Y_1 \end{pmatrix} = \begin{pmatrix} x_1 - \Delta x \\ y_1 - \Delta y \end{pmatrix} \quad (1)$$

Also, the relationship between the coordinate system of the image surface and the spatial coordinate system of image #2 is defined by:

$$\frac{f}{z_2}\begin{pmatrix} X_2 \\ Y_2 \end{pmatrix} = \begin{pmatrix} x_2 - \Delta x \\ y_2 - \Delta y \end{pmatrix} \quad (2)$$

Furthermore, the relationship between the spatial coordinate systems $X_1 Y_1 Z_1$ and $X_2 Y_2 Z_2$ is described by:

$$\begin{pmatrix} X_2 \\ Y_2 \\ Z_2 \end{pmatrix} = M \begin{pmatrix} X_1 \\ Y_1 \\ Z_1 \end{pmatrix} - \begin{pmatrix} \Delta X \\ \Delta Y \\ \Delta Z \end{pmatrix} \text{ for} \quad (3)$$

$$M(\Delta\alpha, \Delta\beta, \Delta\gamma) =$$

$$\begin{pmatrix} \cos\Delta\beta \cdot \cos\Delta\gamma & \cos\Delta\beta \cdot \sin\Delta\gamma & -\sin\Delta\beta \\ \sin\Delta\alpha \cdot \sin\Delta\beta \cdot \cos\Delta\gamma - \cos\Delta\alpha \cdot \cos\Delta\gamma & \sin\Delta\alpha \cdot \sin\Delta\beta \cdot \sin\Delta\gamma + \cos\Delta\alpha \cdot \cos\Delta\gamma & \sin\Delta\alpha \cdot \cos\Delta\beta \\ \cos\Delta\alpha \cdot \sin\Delta\beta \cdot \cos\Delta\gamma + \sin\Delta\alpha \cdot \sin\Delta\gamma & \cos\Delta\alpha \cdot \sin\Delta\beta \cdot \sin\Delta\gamma + \sin\Delta\alpha \cdot \cos\Delta\gamma & \cos\Delta\alpha \cdot \cos\Delta\beta \end{pmatrix}$$

More specifically, a distance $Z_1$ at each point in the object region of image #1 is calculated using equations (1) to (3) above. At this time, distances are respectively calculated from the relations corresponding to x and y, and the distance calculated using the relations for x and the distance calculated using the relations for y are averaged. $X_1$ and $Y_1$ are calculated using $Z_1$ and equation (1) above to output coordinates $(X_1, Y_1, Z_1)$ in correspondence with the number of pairs of corresponding points. The spatial coordinate data are combined as the output from the distance distribution extraction unit 54 together with a pixel value g at the coordinates $(x_1, y_1)$ of image #1, and are output in the form of $(X_1, Y_1, Z_1, g)$.

Subsequently, the three-dimensional model forming unit 55 forms a three-dimensional model of the object 3 to be measured using the distance image data as the output from the distance distribution extraction unit 54 and the parameter SP data. As shown in FIG. 11, the three-dimensional model of the object 3 to be measured defines the surface shape of the object 3 to be measured using the spatial coordinates (r, $\theta$, $\phi$) of the polar coordinate system, and has an r component (radial component) and pixel values as data in units of regions ($\theta$, $\phi$). Each region ($\theta$, $\phi$) is a mesh-shaped region designated by the input device 13 in accordance with the resolution of the three-dimensional shape. Also, the spatial coordinates of the origin of the polar coordinate system (r, $\theta$, $\phi$) are also designated from the input device 13. The distance data is converted into polar coordinates by the three-dimensional model write address calculation unit 551 on the basis of the parameter SP data, i.e., the view point position, view point moving amount, and optical axis rotation amount, and the origin coordinates of the polar coordinate system, and r components and pixel values are written at addresses corresponding to regions ($\theta$, $\phi$) of the three-dimensional model storage unit 552. At this time, counters corresponding to the respective storage areas are incremented at the same time.

When the next distance image data is input from the distance distribution extraction unit 54, and the converted data is written in the already stored area, the average value of data is stored as new three-dimensional model data of the object 3 to be measured with reference to the value of each counter. In this manner, the three-dimensional model of the object 3 to be measured is formed by sequentially adding the data of the three-dimensional model to the three-dimensional model storage unit 552 while the shutter signal S4 supplied to the camera processing device 5 via the input interface unit 51 is ON.

The 3D display image generation unit 56 converts the three-dimensional model data of the object 3 to be measured into a two-dimensional display image. More specifically, the image generation unit 562 generates a two-dimensional image by performing perspective transformation (viewing transformation) shown in FIG. 12 on the basis of the directions of the coordinate axes of the coordinate system, view point position, and visual axis direction of a display image, which are set in advance in the coordinate system parameter setting unit 561, the polar coordinate value (r, $\theta$, g) as data of the three-dimensional model sequentially stored in the three-dimensional model storage unit 552, and the pixel values. At this time, the coordinate system parameter setting unit 561 sequentially changes the directions of the coordinate axes of the coordinate system of the display image. Therefore, a stereoscopic image can be time-serially displayed as if the three-dimensional model of the object 3 to be measured were rotated about the coordinate axes. The user observes this display image, and completes the input operation if he or she confirms that desired three-dimensional data is obtained. The three-dimensional model write control unit 553 controls to write the three-dimensional model of the object 3 to be measured formed in the three-dimensional model storage unit 552 in the storage device 14 of the computer 1 when the shutter signal S4 changes from the ON state to the OFF state.

According to the above-mentioned first embodiment of the present invention, images can be input while sequentially monitoring the three-dimensional shape of the object 3 to be measured, and desired three-dimensional data can be obtained. This embodiment is particularly effective for the purpose of obtaining the three-dimensional shape of nearly the entire surface of the object 3 to be measured when the size of the object 3 to be measured is relatively small like an object that can be placed on a table.

Second Embodiment

The second embodiment of the present invention will be described below.

The second embodiment of a three-dimensional shape extraction apparatus which is effective for the purpose of obtaining the distribution of the three-dimensional shape of the surface of an object over a broad range when the object, the three-dimensional shape of which is to be obtained, is relatively large such as the environment in a room, will be described below.

The basic arrangement of the second embodiment of the present invention is substantially the same as that of the first embodiment shown in FIG. 2. Also, the arrangements of the camera 2 and the camera processing device 5 of this embodiment are substantially the same as those of the first embodiment shown in FIGS. 4 and 5. Hence, a detailed description thereof will be omitted.

FIG. 13 shows the image input state in the three-dimensional shape extraction apparatus according to the second embodiment. As shown in FIG. 13, when the object is an environment in a room or the like, the camera 2 time-serially senses a plurality of images in the order of image #1, image #2, ..., image #N (image #1 is one sensed at time t=$t_1$, image #2 is one sensed at time t=$t_2$, and image #N is one sensed at time t=$t_N$) The image sensing operation is completed when three-dimensional data within a desired range is obtained. In this image input operation, a window (to be referred to as a panorama window hereinafter) 35 that can display an image in a broad field of view is generated on the display device 12 of the computer 1, and displays the image of the corresponding object in accordance with the regions of the three-dimensional data which are obtained in succession, as shown in FIG. 14. Referring to FIG. 14, the left panorama window at time t=$t_1$ is generated based on images #1 and #2. By repeating the above-mentioned processing until time t=$t_N$, the right panorama window at time t=$t_N$ is generated.

The operation of this embodiment will be described below while focusing on the difference from the first embodiment.

When the image input program of the computer 1 is started as in the first embodiment, the processing device 11 in the computer 1 generates the finder window 32, and displays it on the display device 12. An image fetched via the image sensing lens 21 in the state wherein the power switch of the camera 2 is ON is supplied as an image signal S1 to the camera processing device 5. The image signal S1 is received by the input interface unit 51 of the camera processing device 5, and is output as digital image data via the image data construction unit 52. The digital image data is written in the internal graphic memory of the processing device 11 in the computer 1, and the processing device 11 displays this image on the finder window 32 on the display device 12. At the same time, a lens position signal S2 is supplied to the camera processing device 5.

The user determines framing while observing the displayed image, and then presses the shutter 28. A shutter signal S4 from the shutter 28 is sent to the camera processing device 5. On the other hand, the camera displacement detection device 27 always detects the displacement of the position and posture of the camera while the power switch of the camera 2 is ON, and sends a camera displacement signal S3 to the camera processing device 5. The lens position signal S2 is supplied to the view point position calculation circuit 532 in the parameter calculation unit 53. The view point position calculation unit 532 obtains the view point position by reading out the view point position correction table stored in the lens information storage unit 531 in accordance with the value of the lens position signal S2. On the other hand, the camera displacement signal S3 is supplied to the view point displacement calculation circuit 533 which obtains the view point moving amount and the optical axis rotation amount by performing a matrix calculation using view point conversion data stored in the lens information storage unit 531. The view point position data, the view point moving amount data, and the optical axis rotation amount data are combined as output parameter SP data of the parameter calculation unit 53 in the parameter output unit 534.

The distance distribution extraction unit 54 extracts the distance distribution from the digital image data obtained at different times t=$t_1$ and t=$t_2$ and the parameter SP data as a result of the above-mentioned processing. In this embodiment, the object region extraction unit 541 does not perform any processing, and directly outputs sensed image data. Therefore, of the arrangement of the distance distribution extraction unit 54 shown in FIG. 7, the object region extraction unit 541 is not necessary in this embodiment. The matching processing unit 543 performs matching between the image data by utilizing the parameter SP data, i.e., the view point position, view point moving amount, and optical axis rotation amount. The distance calculation unit 544 calculates the distance to the object 3 to be measured on the basis of the parameter SP data, i.e., the view point position, view point moving amount, and optical axis rotation amount, and pairs of corresponding points as the outputs from the matching processing unit 543. The spatial coordinate data as the output from the distance calculation unit 544 are combined as the output from the distance distribution extraction unit 54 together with a pixel value g at the coordinates ($x_1$, $y_1$) of image #1 in the distance image data output unit 545, and are output in the form of ($x_1$, $Y_1$, $Z_1$, g).

The three-dimensional model forming unit 55 forms a three-dimensional model of the object 3 to be measured using the distance image data output from the distance distribution extraction unit 54 and the parameter SP data. The three-dimensional model of the object 3 to be measured in this embodiment projects the surface shape of an object onto a projection surface p1, and has distances z and pixel values in units of regions of two-dimensional orthogonal coordinates (x, y), as shown in FIG. 15. The projection surface pi is defined by the view point position of the projection surface, the distance and direction from the view point, and is designated by the input device 13. The projection surface pi is defined to be able to cover a field of view broader than the image sensing region of the image sensing lens 21.

The distance data is coordinate-converted by the three-dimensional model write address calculation unit 551 on the basis of the parameter SP data, i.e., the view point position, view point moving amount, and optical axis rotation amount, and the parameters of the view point position, and the distance and direction from the view point, which define the projection surface p1, and distances and pixel values are written at addresses corresponding to regions (x, y) of the three-dimensional model storage unit 552. At this time, counters corresponding to the respective storage areas are incremented. When the next distance image data is input from the distance distribution extraction unit 54, and the converted data is written in the already stored area, the average value of data is stored as new three-dimensional model data of the object 3 to be measured with reference to the value of each counter. In this manner, the three-dimensional model of the object 3 to be measured is formed by sequentially adding the data of the three-dimensional model to the three-dimensional model storage unit 552 while the shutter signal S4 supplied to the camera processing device 5 via the input interface unit 51 is ON.

The 3D display image generation unit 56 converts the three-dimensional model data of the object 3 to be measured into a two-dimensional display image. In this embodiment, the image generation unit 562 directly generates a display image based on data in the three-dimensional model storage unit 552. Therefore, the 3D display image generation unit 56 does not have an arrangement shown in FIG. 9, but performs control for transferring data in the three-dimensional model storage unit 552 in FIG. 8 to the processing device 11 in the computer 1. Since the projection surface p1 is defined to be able to cover a field of view broader than the image sensing region of the image sensing lens 21, an image obtained as a result of acquiring three-dimensional data in the broad field of view is displayed on the panorama window 35 of the display device 12.

The user observes this display image, and completes the input operation if he or she confirms that desired three-dimensional data is obtained. The three-dimensional model write control unit 553 controls to write the three-dimensional model of the object 3 to be measured formed in the three-dimensional model storage unit 552 in the storage device 14 of the computer 1 when the shutter signal S4 changes from the ON state to the OFF state.

As described above, according to the first and second embodiments, the distance distribution of an object is extracted using a plurality of images which are sensed at a plurality of image sensing positions so that the respective images of the object partially overlap each other, and the detection positions of the respective image sensing positions, a three-dimensional model of the object is formed using the extracted distance distribution, the sensed images, and the detection positions, and a two-dimensional image is generated and displayed based on the three-dimensional model. Hence, the image input operation can be performed while sequentially monitoring the extracted three-dimensional shape of the object without requiring any cumbersome setting operations, thus efficiently obtaining a required portion of the three-dimensional shape of the object.

According to the first embodiment, since the three-dimensional model is described using parameters of pixel values and radial component of the three-dimensional polar coordinate system at addresses designated by two angle parameters, a display suitable for obtaining the three-dimensional shape of nearly the entire surface of a relatively small object can be attained, and the image input operation is facilitated.

According to the second embodiment, since the three-dimensional model is formed by describing pixel values and object distances obtained from the distance distribution by the perspective transformation at addresses designated by the two-dimensional orthogonal coordinate system, a display suitable for obtaining the three-dimensional distribution of the surface of a relatively large object over a broad range can be attained, and the image input operation is facilitated.

As many apparently widely different embodiments of the present invention can be made without departing from the spirit and scope thereof, it is to be understood that the invention is not limited to the specific embodiments thereof except as defined in the appended claims.

What is claimed is:

1. A three-dimensional model data forming apparatus for forming three-dimensional model data of an object sensed by image sensing means, comprising:
   first detection means for detecting an image sensing position of said image sensing means;
   second detection means for detecting a lens position of said image sensing means;
   calculation means for calculating a parameter on the basis of outputs from said first and second detection means;
   distance distribution extraction means for extracting a distance distribution of the object on the basis of a plurality of images which are sensed by said image sensing means at a plurality of image sensing positions so that the respective images of the object partially overlap each other, and the parameter calculated by said calculation means;
   three-dimensional model data forming means for forming the three-dimensional model data of the object on the basis of the distance distribution extracted by said distance distribution extraction means, the plurality of images, and the parameter;
   two-dimensional image generation means for generating a two-dimensional image on the basis of the three-dimensional model data output from said three-dimensional model data forming means; and
   monitoring means for displaying the two-dimensional image and for designating the displayed two-dimensional image corresponding to a part shape of the object so that it is possible to visually monitor a forming process for forming three-dimensional model data corresponding to a desired portion of the three-dimensional shape of the object.

2. The apparatus according to claim 1, wherein said three-dimensional model data forming means describes the three-dimensional model data using parameters of a pixel value and a radial component of a three-dimensional polar coordinate system with respect to an address designated by two angle parameters of the three-dimensional polar coordinate system.

3. The apparatus according to claim 2, wherein said two-dimensional image generation means describes the three-dimensional model data at an address designated by a two-dimensional model at an address designated by a two-dimensional orthogonal coordinate system by performing a viewing transformation on the basis of directions of coordinate axes of a coordinate system, a view point position, and a visual axis direction of a display image, which are set in advance, and the parameters of the pixel value and the radial component of the three-dimensional polar coordinate system.

4. The apparatus according to claim 1, wherein said calculation means calculates view point position data, view point moving amount data, and optical axis rotation amount data in accordance with the outputs from said first and second detection means.

5. The apparatus according to claim 4, wherein said calculation means calculates the view point moving amount data and the optical axis rotation amount data in accordance with the output from said first detection means and predetermined view point conversion data.

6. The apparatus according to claim 4, wherein said calculation means calculates the view point position data on the basis of the output from said second detection means and predetermined view point position correction data.

7. The apparatus according to claim 1, wherein said distance distribution extraction means extracts a predetermined object from each of the plurality of images, and extracts the distance distribution with respect to the extracted object.

8. The apparatus according to claim 1, wherein said monitoring means is also for displaying the image sensed by said image sensing means together with the two-dimensional image.

9. The apparatus according to claim 1, wherein said distance distribution extraction means performs matching processing of corresponding points between two image data.

10. The apparatus according to claim 9, wherein said distance distribution extraction means calculates a distance to the object on the basis of a pair of corresponding points obtained by the matching processing and the parameter.

11. The apparatus according to claim 1, wherein said distance distribution extraction means extracts a predetermined object from each of the plurality of images, and performs matching processing of corresponding points between the two extracted objects.

12. The apparatus according to claim 11, wherein said distance distribution extraction means calculates a distance to the object on the basis of a pair of corresponding points obtained by the matching processing and the parameter.

13. The apparatus according to claim 1, wherein said three-dimensional model data forming means converts the distance distribution into polar coordinates on the basis of the parameter.

14. The apparatus according to claim 13, further comprising storage means for storing the distance distribution using a coordinate value of the polar coordinates as an address.

15. A method of forming three-dimensional model data of an object sensed by image sensing means, comprising the steps of:

first detection step of detecting an image sensing position of said image sensing means;

second detection step of detecting a lens position of said image sensing means;

calculation step of calculating a parameter on the basis of outputs from said first and second detection steps;

extraction step of extracting a distance distribution of the object on the basis of a plurality of images which are sensed by said images sensing means at a plurality of image sensing positions so that the respective images of the object partially overlap each other, and the parameter calculated by said calculation step;

forming step of forming three-dimensional model data of the object on the basis of the distance distribution extracted by said extraction step, the plurality of images, and the parameter;

generation step of generating a two-dimensional image of the basis of the three-dimensional model data formed in said forming step; and monitoring step of displaying the two-dimensional image and of designating the displayed two-dimensional image corresponding to a part shape of the object, so that it is possible to visually monitor a forming process for forming three-dimensional model data corresponding to a desired portion of the three-dimensional shape of the object.

16. The method according to claim 15, wherein said forming step describes the three-dimensional model data using parameters of a pixel value and a radial component of a three-dimensional polar coordinate system with respect to an address designated by two angle parameters of the three-dimensional polar coordinate system.

17. The method according to claim 16, wherein said generation step describes the three-dimensional model data at an address designated by a two-dimensional orthogonal coordinate system by performing a viewing transformation on the basis of directions of coordinate axes of a coordinate system, a view point position, and a visual axis direction of a display image, which are set in advance, and the parameters of the pixel value and the radial component of the three-dimensional polar coordinate system.

18. The method according to claim 15, wherein said calculation step calculates view point position data, view point moving amount data, and optical axis rotation amount data in accordance with the detected results in said first and second detection steps.

19. The method according to claim 18, wherein said calculation step calculates the view point moving amount data and the optical axis rotation amount data in accordance with the detected results in said first detection steps and predetermined view point conversion data.

20. The method according to claim 17, wherein said calculation step calculates the view point position data on the basis of the detected result in said second detection step and predetermined view point position correction data.

21. The method according to claim 15, wherein said extraction step extracts a predetermined object from each of the plurality of images, and extracts the distance distribution with respect to the extracted object.

22. The method according to claim 15, wherein said monitoring step also displays the image sensed by said image sensing means together with the two-dimensional image.

23. The method according to claim 15, wherein said extraction step performs matching processing of corresponding points between two image data.

24. The method according to claim 23, wherein said extraction step calculates a distance to the object on the basis of a pair of corresponding points obtained by the matching processing and the parameter.

25. The method according to claim 15, wherein said extraction means extracts a predetermined object from each of the plurality of images, and performs matching processing of corresponding points between the two extracted objects.

26. The method according to claim 25, wherein said extraction step calculates a distance to the object on the basis of a pair of corresponding points obtained by the matching processing and the parameter.

27. The method according to claim 15, wherein said forming step converts the distance distribution into polar coordinates on the basis of the parameter.

28. The method according to claim 27, further comprising storage step of storing the distance distribution using a coordinate value of the polar coordinates as an address.

29. A three-dimensional model data processing apparatus for processing three-dimensional model data of an object sensed by image sensing means, comprising;
- first input means for inputting an image sensing position of said image sensing means;
- second input means for inputting operating state information of said image sensing means;
- calculation means for calculating a parameter on the basis of outputs from said first and second detection means;
- distance distribution detecting means for detecting a distance distribution of the object on the basis of a plurality of images which are sensed by said image sensing means at a plurality of image sensing positions so that the respective images of the object partially overlap each other, the parameter calculated by said calculation means;
- three-dimensional model data forming means for forming a three-dimensional model data of the object on the basis of the distance distribution detected by said distance distribution detecting means, the plurality of images, and the parameter;
- two-dimensional image generation means for generating a two-dimensional image on the basis of the three-dimensional model data output from said three-dimensional model data forming means; and
- monitoring means for displaying the two-dimensional image and for designating the displayed two-dimensional image corresponding to a part shape of the object, so that it is possible to visually monitor a processing for forming three-dimensional model data corresponding to a desired portion of the three-dimensional shape of the object.

30. The apparatus according to claim 29, wherein said three-dimensional model data forming means describes the three-dimensional model data using parameters of a pixel value and a radial component of a three-dimensional polar coordinate system with respect to an address designated by two angle parameters of the three-dimensional polar coordinate system.

31. The apparatus according to claim 30, wherein said two-dimensional image generation means describes the three-dimensional model data at an address designated by a two-dimensional orthogonal coordinate system by performing a viewing transformation on the basis of directions of coordinate axes of a coordinate system, a view point position, and a visual axis direction of a display image, which are set in advance, and the parameters of the pixel value and the radial component of the three-dimensional polar coordinate system.

32. The apparatus according to claim 29, wherein said calculation means calculates view point position data, view point moving amount data, and optical axis rotation amount data in accordance with the outputs from said first and second input means.

33. The apparatus according to claim 32, wherein said calculation means calculates the view point moving amount data and the optical axis rotation amount data in accordance with the output from said first input means and predetermined view point conversion data.

34. The apparatus according to claim 32, wherein said calculation means calculates the view point position data on the basis of the output from said second input means and predetermined view point position correction data.

35. The apparatus according to claim 29, wherein said monitoring means is also for displaying the image sensed by said image sensing means together with the two-dimensional image.

36. The apparatus according to claim 29, wherein said distance distribution detecting means performs matching processing of corresponding points or images between two image data and calculates a distance to the object on the basis of a pair of corresponding points obtained by the matching processing and the parameter.

37. The apparatus according to claim 29, wherein said three-dimensional model data processing means converts the distance distribution into polar coordinates on the basis of the parameter.

* * * * *